(12) United States Patent
Saarenvirta

(10) Patent No.: US 11,790,383 B2
(45) Date of Patent: *Oct. 17, 2023

(54) SYSTEM AND METHOD FOR SELECTING PROMOTIONAL PRODUCTS FOR RETAIL

(71) Applicant: Daisy Intelligence Corporation, Toronto (CA)

(72) Inventor: Kari Saarenvirta, Toronto (CA)

(73) Assignee: Daisy Intelligence Corporation, Toronto (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/834,628

(22) Filed: Mar. 30, 2020

(65) Prior Publication Data

US 2020/0372529 A1 Nov. 26, 2020

Related U.S. Application Data

(62) Division of application No. 15/795,821, filed on Oct. 27, 2017, now Pat. No. 11,562,386.

(30) Foreign Application Priority Data

Oct. 18, 2017 (CA) .................................. CA 2982930

(51) Int. Cl.
G06Q 10/0637 (2023.01)
G06Q 30/0201 (2023.01)
(Continued)

(52) U.S. Cl.
CPC ..... *G06Q 30/0206* (2013.01); *G06Q 10/0637* (2013.01); *G06Q 30/0204* (2013.01);
(Continued)

(58) Field of Classification Search
None
See application file for complete search history.

(56) References Cited

U.S. PATENT DOCUMENTS 5,920,848 A 7/1999 Schutzer et al.
5,926,798 A 7/1999 Carter
(Continued)

FOREIGN PATENT DOCUMENTS

CA 2982930 * 10/2017
CA 2982930 * 4/2019
(Continued)

OTHER PUBLICATIONS

Saarenvirta, Kari Tapio Evaluation of turbulence models for internal flows 2003 0258-0258 (Year: 2003).*

(Continued)

*Primary Examiner* — Octavian Rotaru
(74) *Attorney, Agent, or Firm* — BERESKIN & PARR LLP/S.E.N.C.R.L. s.r.l; Isis E. Caulder; Paul Blizzard

(57) ABSTRACT

A computer system and computer-implemented method for retail merchandise planning, including promotional product selection, price optimization and planning. According to an embodiment, the computer system for generating an electronic retail plan for a retailer comprises, a data staging module configured to input retail sensory data from one or more computer systems associated with the retailer; a data processing module configured to pre-process the inputted retail sensory data; a data warehouse module configured to store the inputted retail sensory data and the pre-processed retail sensory data; a state model module configured to generate a retailer state model for modeling operation of the retailer based on the retail sensory data; a calibration module configured to calibrate the state model module according to one or more control parameters; and an output module for generating an electronic retail plan for the retailer based on the retailer state model.

26 Claims, 38 Drawing Sheets

(51) Int. Cl.
  *G06Q 30/0204* (2023.01)
  *G06Q 30/0241* (2023.01)
  *G06Q 30/0251* (2023.01)
  *G06Q 30/0207* (2023.01)
(52) U.S. Cl.
  CPC ..... *G06Q 30/0207* (2013.01); *G06Q 30/0247* (2013.01); *G06Q 30/0252* (2013.01)

(56) References Cited

U.S. PATENT DOCUMENTS

| | | | |
|---|---|---|---|
| 5,953,707 | A | 9/1999 | Huang et al. |
| 6,029,139 | A | 2/2000 | Cunningham et al. |
| 6,032,146 | A * | 2/2000 | Chadha ............... G06F 16/283 707/999.005 |
| 6,119,101 | A | 9/2000 | Peckover |
| 6,366,890 | B1 | 4/2002 | Usrey |
| 6,401,080 | B1 | 6/2002 | Bigus et al. |
| 6,609,101 | B1 * | 8/2003 | Landvater ......... G06Q 30/0202 705/7.31 |
| 6,892,376 | B2 | 5/2005 | McDonald et al. |
| 6,910,017 | B1 | 6/2005 | Woo et al. |
| 7,024,592 | B1 | 4/2006 | Voas et al. |
| 7,069,560 | B1 | 6/2006 | Cheyer et al. |
| 7,130,811 | B1 | 10/2006 | Delurgio et al. |
| 7,249,031 | B2 | 7/2007 | Close et al. |
| 7,249,032 | B1 | 7/2007 | Close et al. |
| 7,249,033 | B1 | 7/2007 | Close et al. |
| 7,302,410 | B1 * | 11/2007 | Venkatraman ....... G06Q 20/201 705/35 |
| 7,379,890 | B2 | 5/2008 | Myr et al. |
| 7,480,623 | B1 * | 1/2009 | Landvater ......... G06Q 30/0202 705/7.31 |
| 7,523,047 | B1 | 4/2009 | Neal et al. |
| 7,668,769 | B2 | 2/2010 | Baker et al. |
| 7,672,866 | B2 | 3/2010 | Venkatraman et al. |
| 7,752,067 | B2 | 7/2010 | Fotteler et al. |
| 8,010,404 | B1 | 8/2011 | Wu et al. |
| 8,370,184 | B2 | 2/2013 | Fotteler et al. |
| 8,370,185 | B2 | 2/2013 | Fotteler et al. |
| 8,620,722 | B2 | 12/2013 | Kettner et al. |
| 8,639,548 | B1 | 1/2014 | Fotteler et al. |
| 8,639,558 | B2 | 1/2014 | Desai et al. |
| 9,940,649 | B2 | 4/2018 | Rosenberg |
| 10,074,142 | B1 | 9/2018 | Rozenson |
| 10,141,780 | B2 | 11/2018 | Sun et al. |
| 10,147,065 | B1 | 12/2018 | Yiftachel et al. |
| 10,567,402 | B1 | 2/2020 | Comeaux et al. |
| 10,621,533 | B2 | 4/2020 | Saarenvirta |
| 10,832,251 | B1 | 11/2020 | Pike et al. |
| 10,878,460 | B2 * | 12/2020 | Genc-Kaya ........ G06Q 30/0247 |
| 11,468,387 | B2 | 10/2022 | Saarenvirta |
| 2002/0069134 | A1 | 6/2002 | Solomon |
| 2002/0116349 | A1 | 8/2002 | Batachia et al. |
| 2002/0147630 | A1 | 10/2002 | Rose et al. |
| 2003/0149578 | A1 | 8/2003 | Wong |
| 2003/0187708 | A1 | 10/2003 | Baydar et al. |
| 2003/0229502 | A1 | 12/2003 | Woo |
| 2003/0233305 | A1 | 12/2003 | Solomon |
| 2004/0059549 | A1 | 3/2004 | Kropaczek et al. |
| 2004/0205034 | A1 | 10/2004 | Bigus et al. |
| 2005/0091147 | A1 | 4/2005 | Ingargiola et al. |
| 2005/0125768 | A1 | 6/2005 | Wong et al. |
| 2005/0144218 | A1 | 6/2005 | Heintz |
| 2005/0189414 | A1 | 9/2005 | Fano et al. |
| 2005/0197882 | A1 | 9/2005 | Fotteler et al. |
| 2005/0197886 | A1 | 9/2005 | Veit |
| 2005/0197899 | A1 | 9/2005 | Veit et al. |
| 2005/0197901 | A1 | 9/2005 | Veit et al. |
| 2005/0197928 | A1 | 9/2005 | Fotteler et al. |
| 2005/0234696 | A1 | 10/2005 | North et al. |
| 2005/0256787 | A1 | 11/2005 | Wadawadigi et al. |
| 2005/0267807 | A1 | 12/2005 | Bentley |
| 2005/0273376 | A1 | 12/2005 | Ouimet et al. |
| 2005/0288993 | A1 | 12/2005 | Weng et al. |
| 2006/0020866 | A1 | 1/2006 | Lo et al. |
| 2006/0155660 | A1 | 7/2006 | Koshizen et al. |
| 2007/0033098 | A1 | 2/2007 | Peters et al. |
| 2007/0143186 | A1 | 6/2007 | Apple et al. |
| 2007/0192168 | A1 | 8/2007 | Van Luchene |
| 2007/0282668 | A1 | 12/2007 | Cereghini et al. |
| 2007/0282684 | A1 | 12/2007 | Prosser et al. |
| 2007/0294736 | A1 | 12/2007 | Brady et al. |
| 2008/0065476 | A1 | 3/2008 | Klein et al. |
| 2008/0077459 | A1 | 3/2008 | Desai et al. |
| 2008/0235076 | A1 | 9/2008 | Cereghini et al. |
| 2008/0288354 | A1 | 11/2008 | Flinn et al. |
| 2009/0070129 | A1 | 3/2009 | Inbar et al. |
| 2009/0112608 | A1 | 4/2009 | Abu-Hakima et al. |
| 2009/0138365 | A1 | 5/2009 | Mueller et al. |
| 2009/0249287 | A1 | 10/2009 | Patrick |
| 2009/0259516 | A1 | 10/2009 | Zeevi et al. |
| 2009/0271245 | A1 | 10/2009 | Joshi et al. |
| 2009/0327476 | A1 | 12/2009 | Grell et al. |
| 2010/0100418 | A1 | 4/2010 | Richter et al. |
| 2010/0106561 | A1 | 4/2010 | Peredriy et al. |
| 2010/0145773 | A1 | 6/2010 | Desai et al. |
| 2010/0169114 | A1 | 7/2010 | Henderson et al. |
| 2010/0205044 | A1 | 8/2010 | Scheer |
| 2010/0217702 | A1 | 8/2010 | Tu |
| 2010/0235231 | A1 | 9/2010 | Jewer et al. |
| 2010/0287029 | A1 | 11/2010 | Dodge et al. |
| 2010/0318403 | A1 | 12/2010 | Bottom |
| 2010/0324941 | A1 | 12/2010 | Stevenson et al. |
| 2011/0107260 | A1 | 5/2011 | Park et al. |
| 2012/0226613 | A1 | 9/2012 | Adjaoute |
| 2012/0245887 | A1 | 9/2012 | Spears et al. |
| 2013/0145174 | A1 | 6/2013 | Hallum et al. |
| 2013/0218498 | A1 | 8/2013 | Droit et al. |
| 2013/0325596 | A1 | 12/2013 | Ouimet |
| 2014/0058763 | A1 | 2/2014 | Zizzamia et al. |
| 2014/0278479 | A1 | 9/2014 | Wang et al. |
| 2014/0314225 | A1 | 10/2014 | Riahi et al. |
| 2015/0046332 | A1 | 2/2015 | Adjaoute |
| 2015/0081393 | A1 * | 3/2015 | Cohen ............... G06Q 30/0206 705/7.35 |
| 2015/0161622 | A1 | 6/2015 | Hoffmann et al. |
| 2015/0195300 | A1 | 7/2015 | Adjaoute |
| 2015/0227951 | A1 * | 8/2015 | Hawley ............. G06Q 30/0202 705/7.31 |
| 2015/0242947 | A1 | 8/2015 | Wilson et al. |
| 2015/0324828 | A1 * | 11/2015 | Ouimet ............. G06Q 30/0225 705/14.23 |
| 2015/0324884 | A1 | 11/2015 | Ouimet |
| 2015/0339672 | A1 | 11/2015 | Adjaoute |
| 2015/0379510 | A1 | 12/2015 | Smith |
| 2016/0055427 | A1 * | 2/2016 | Adjaoute ............... G06N 20/00 706/12 |
| 2016/0148227 | A1 | 5/2016 | Choe et al. |
| 2016/0180222 | A1 | 6/2016 | Sierhuis et al. |
| 2017/0004430 | A1 | 1/2017 | Auradkar et al. |
| 2017/0032400 | A1 * | 2/2017 | Gilmore ............ G06Q 30/0206 |
| 2017/0221086 | A1 * | 8/2017 | Zhou ................. G06Q 30/0247 |
| 2017/0236153 | A1 | 8/2017 | Ouimet |
| 2017/0249648 | A1 | 8/2017 | Garvey et al. |
| 2017/0270582 | A1 * | 9/2017 | Forss ................... G06V 10/764 |
| 2017/0337198 | A1 | 11/2017 | Saha et al. |
| 2017/0357563 | A1 | 12/2017 | Shah |
| 2018/0033059 | A1 * | 2/2018 | Katsuki ................. G06N 5/01 |
| 2018/0053114 | A1 | 2/2018 | Adjaoute |
| 2018/0060964 | A1 | 3/2018 | Arora et al. |
| 2018/0101876 | A1 | 4/2018 | Rosenberg et al. |
| 2018/0121988 | A1 * | 5/2018 | Hiranandani ............. G06T 7/74 |
| 2018/0225607 | A1 | 8/2018 | Girishankar et al. |
| 2018/0293640 | A1 | 10/2018 | Krappe |
| 2018/0300337 | A1 | 10/2018 | Thomas et al. |
| 2019/0079958 | A1 | 3/2019 | Bentley et al. |
| 2019/0084420 | A1 | 3/2019 | Kim et al. |
| 2019/0114687 | A1 | 4/2019 | Krishnamurthy et al. |
| 2019/0130407 | A1 | 5/2019 | Adjaoute |
| 2019/0197441 | A1 | 6/2019 | Park et al. |
| 2019/0219993 | A1 | 7/2019 | Jin et al. |
| 2019/0259033 | A1 | 8/2019 | Reddy et al. |
| 2019/0362380 | A1 | 11/2019 | Kochar et al. |

(56) References Cited

U.S. PATENT DOCUMENTS

| | | | |
|---|---|---|---|
| 2021/0133752 A1 | 5/2021 | Harris et al. | |
| 2021/0279753 A1 | 9/2021 | Saarenvirta | |
| 2022/0237620 A1 | 7/2022 | Saarenvirta | |

FOREIGN PATENT DOCUMENTS

| | | | | |
|---|---|---|---|---|
| CN | 111539733 A | 8/2020 | | |
| GB | 2380000 A | 3/2003 | | |
| WO | 2005089289 A2 | 9/2005 | | |
| WO | WO-2010068551 A * | 6/2010 | ............ | G06Q 30/02 |
| WO | WO-2010068551 A1 * | 6/2010 | ............ | G06Q 30/02 |
| WO | 2013003064 A1 | 1/2013 | | |
| WO | 2016137443 A1 | 9/2016 | | |

OTHER PUBLICATIONS

Identity matrix, wikipedia, archives org, Dec. 17, 2017 https://web.archive.org/web/20171217060011/https://en.wikipedia.org/wiki/Identity_matrix (Year: 2017).*

Autoencoder, wikipedia, archives org, Jul. 20, 2017 https://web.archive.org/web/20170720143217/https://en.wikipedia.org/wiki/Autoencoder (Year: 2017).*

Saarenvirta, "Evaluation of Turbulence Models for Internal Flows", Thesis for Degree of Master of Applied Science, Dept. of Aerospace Science and Engineering, University of Toronto, 2002, published 2003. (187 pages).

Notices of Allowance and References Cited dated Oct. 17, 2019 in U.S. Appl. No. 15/872,530 (21 pages).

Non-Final Office Action and Notice of References Cited dated Feb. 3, 2020 in U.S. Appl. No. 15/795,821 (35 pages).

Final Office Action and Notice of References Cited dated May 14, 2020 in corresponding U.S. Appl. No. 15/795,821 (39 pages).

Non-Final Office Action, Applicant Initiated Interview Summary, and Notice of References Cited dated Jan. 1, 2021 in U.S. Appl. No. 16/587,960 (46 pages).

Non-Final Office Action and Notice of References Cited dated Apr. 6, 2021 in U.S. Appl. No. 15/795,821 (51 pages).

Final Office Action and Notice of References Cited dated May 12, 2021 in U.S. Appl. No. 16/587,960 (50 pages).

Extended European Search Report dated Jul. 16, 2021 in EP Patent Application No. 21160557.1 (9 pages).

Final Office Action and Notice of References Cited dated Dec. 29, 2021 in U.S. Appl. No. 15/795,821 (54 pages).

Non-Final Office Action and Notice of References Cited dated Mar. 3, 2022 in U.S. Appl. No. 16/807,214 (36 pages).

Gün et al., "Assortment planning using data mining algorithms," PICMET '08—2008 Portland International Conference on Management of Engineering & Technology, pp. 2312-2322.

Schwalb et al., "Leveraging in-memory technology for interactive analyses of point-of-sales data," 2014 IEEE 30th International Conference on Data Engineering Workshops, pp. 97-102.

Kopap et al., "Association and Classification Analysis on Retail Case Study," 2013 23rd International Conference on Computer Theory and Applications (ICCTA), pp. 141-149.

Non-final Office Action and Notice of References Cited dated May 11, 2022 in U.S. Appl. No. 17/156,025 (40 pages).

Irofti et al., "Quick survey of graph-based fraud detection methods," Jan. 11, 2021, Arxiv.org, pp. 1-13.

Final Office Action and Notice of References Cited dated Nov. 25, 2022 in U.S. Appl. No. 17/156,025 (26 pages).

International Search Report and Written Opinion dated Apr. 14, 2022 in International Patent Application No. PCT/CA2022/050079 (14 pages).

* cited by examiner

Detailed ETL Data Flow and Components for AI Merchandise Planning System

Daisy intelligence retail portal

Home ▼ | Promo product▼ Forecasting▼ Assortment▼ Optimized▼ Optimized▼ Vendor ▼ Reports▼ Site locations▼ Help▼
and price | planning | planning | pricing | scorecard week 201718 ⊙ Department all ⊙ Sub-department all [select dept] ⊙

*Custom view: search by category or department*

*Relative index: Illustrates the relative strength of one recommendation vs another*

All departments current year | last year

| Sub department | Product | O | R | Relative index | Rank | Last promoted | promoted last year | Sales | Daisy performance rank (DPR): ranks top choices to drive results | | | | Sales |
|---|---|---|---|---|---|---|---|---|---|---|---|---|---|
| Dairy | Dairy yogurts & substitute | O | O | 10,000 | 1 | 201703 | No | 5960955 | 1689 | 780 | 575,135.66 | 577244.55 | 457.60 |
| Frozen food | Frozen vegetables | O | O | 9,361 | 2 | 201703 | No | 51329704 | 1901 | 2681 | 510,790.17 | 5114576.44 | 052.84 |
| Bulk | Bulk candy | | | | | | No | 5899356 | 716 | 570 | 515,065.62 | 517331.44 | |
| Bulk | Bulk beans | | | | | | No | 5663027 | | | | | |
| Body care | Aromatherapy oils | | | | | | No | 5226834 | 685 | 626 | 528,603.20 | 538333.87 | |
| Body care | Hair care shampoo | | | 0 | 491 | 201652 | No | 5457031 | | | | | |

*Product: Drill down to view and select specific SKUs to promote*

*Business constraints: customer provided business constraints*

Business constraints
. Dairy milk
. Eggs
. Disco items - grocery
. Produce - fruit - bananas ⊞ Add a product one

FIG. 10B

Retail Sales as a Time Series

1700

UPC
Code  GROCERY

70882039307   TOMATO SAUCE
    3 @ .75                                   2.25 F
4608                GARLIC
    3 @ 3 / 1.00                              1.00 F
PLU        0.49 lb @ 1 lb / 1.29
Code    4067             ZUCCHINI              .63 F
4125094763    MJ VINEGAR
    2 @ 2.79                                  5.58 F
1121000015    TABASCO               2.99 F
7577931116    SUGAR 2LB             2.99 F
4125095231    PIE SHELLS
    1 @ 2 / 3.00                              1.50 F
5260306570    DRINK                 3.79 F
2550000398    COFFEE                7.33 F
*70882039313   TOMATO PASTE
    2 @ .51
    WAS    1.14    NOW               1.02 F
*3320001110    AH BAKE SODA
    WAS    .61     NOW                .59 F
*4125003620    SPAGHETTI
    2 @ 1.09
    WAS    2.38    NOW               2.18 F
*2670011513    COCONUT OIL
    WAS    4.99    NOW               4.49 F

TOTAL
    TOTAL TAX                 .00
    TOTAL                   36.34
PAYMENTS
    CASH          TENDER    40.00
    CASH          CHANGE     3.66

NUMBER OF ITEMS      20

FIG. 17

Association Rule Mining Definitions                                 1800

- An implication of the form :
  - $X \Rightarrow Y$ Where $X \subset I$, $Y \subset I$ and $I$ is the set of all possible itemsets (i.e. a group of items)
- The <u>support</u> for an item set X is the percentage of transactions containing X or $p(X)$ where p indicates the probability of occurrence of the argument.
- A rule's <u>support</u> in a transaction set D is the percentage of transactions which contain $X \cap Y$ or $p(X \cap Y)$
- A rule's <u>confidence</u> in a transaction set D is the percentage of transactions which contain X also contain Y or $conf(X) = p(X \cap Y) / p(X)$
- A rule's <u>lift</u> in a transaction set D is the actual support over the expected support if X and Y are independent or $lift = p(X \cap Y) / p(X) p(Y)$

- Goal : Find all rules with a specified minimum support (minsup) and minimum confidence (minconf)

FIG. 18A

Further Association Rule Mining Definitions — 1830

| k - itemset | An itemset having k items. |
|---|---|
| $L_k$ | Set of large k - itemsets (those with minimum support).<br>Each member of this set has two fields :<br>i) itemset and ii) support count. |
| $C_k$ | Set of candidate k-itemsets (potentially large itemsets).<br>Each member of this set has two fields :<br>i) itemset and ii) support count. |
| $\overline{C}_k$ | Set of candidate k - itemsets when the TIDs of the generating transactions are kept associated with the candidates. |

Further Association Rule Mining Definitions

1) $L_1$ = {large 1-itemsets};
2) $\overline{C_1}$ = database D;
3) for ( k = 2; $L_{k-1} \neq \emptyset$; k++ ) do begin
4)    $C_k$ = apriori-gen($L_{k-1}$); // New candidates
5)    $\overline{C_k}$ = $\emptyset$;
6)    forall entries t ∈ $\overline{C_{k-1}}$ do begin
7)      // determine candidate itemsets in $C_k$ contained
       // in the transaction with identifier t.TID
       $C_t$ = {c ∈ $C_k$ | (c - c[k]) ∈ t.set-of-itemsets ∧
         (c - c[k-1] ∈ t.set-of-itemsets};
8)     forall candidates c ∈ $C_t$ do
9)       c.count++;
10)    if ($C_t \neq \emptyset$) then $\overline{C_k}$ += < t.TID, $C_t$ >;
11)    end
12)    $L_k$ = {c ∈ $C_k$ | c.count ≥ minsup}
13) end
14) Answer = $\bigcup_k L_k$;

FIG. 18C

Affinity is represented as an n x n matrix. For sales and profit maximization each entry is a confidence measure from apriori. The diagonal elements are equal to 1, the sub and super diagonal elements are the confidence for rule with item set n as the rule body and item set m as the rule head Each rule is recast in the form where there is only one itemset in the body and head For transaction optimization support is used in the place of confidence

1900

$$A = \begin{pmatrix} a_{11} & a_{12} & \cdots & a_{1m} \\ a_{21} & a_{22} & \cdots & a_{2m} \\ \vdots & \vdots & & \vdots \\ a_{n1} & a_{n2} & \cdots & a_{nm} \end{pmatrix}_{n \times m} = (a_{ij})_{n \times m}$$

Affinity Matrix

$$B = \begin{pmatrix} B_{11} & B_{12} & \cdots & B_{1p} \\ B_{21} & B_{22} & \cdots & B_{2p} \\ \vdots & \vdots & \ddots & \vdots \\ B_{m1} & B_{m2} & \cdots & B_{mp} \end{pmatrix}$$

Cannibalization is represented as an nxn matrix. Each entry represents the cannibalization of the subtree element m vs element p as a fraction between 0 and 1, indicating the fraction of the sales of p that is cannabalized when m is purchased Cannibalization Matrix

FIG. 23

Product Cannibalization Over Time Illustration

Product Cannibalization over time Illustration

Measuring Cannibalization Period or Cadence

2800 ⟶

$$C = \begin{pmatrix} C_{11} & C_{12} & \ldots & C_{1p} \\ C_{21} & C_{22} & \ldots & C_{2p} \\ \vdots & \vdots & \ddots & \vdots \\ C_{m1} & C_{m2} & \ldots & C_{mp} \end{pmatrix}$$

Cannibalization over time is represented as a 4 dimensional matrix $C_{ijmp}$ for cannibalization between product $i$ versus product $j$ when product $i$ is promoted on week $m$ and product $j$ is promoted on week $n$. Each product cannibalization $ij$ has an N by N matrix (represented by $m$ and $p$) where N is the number of periods allowed for measuring cannibalization. The cadence value for each product combination $ij$ must be less than or equal to 2N.

Cannibalization Matrix over time matrix

FIG. 28

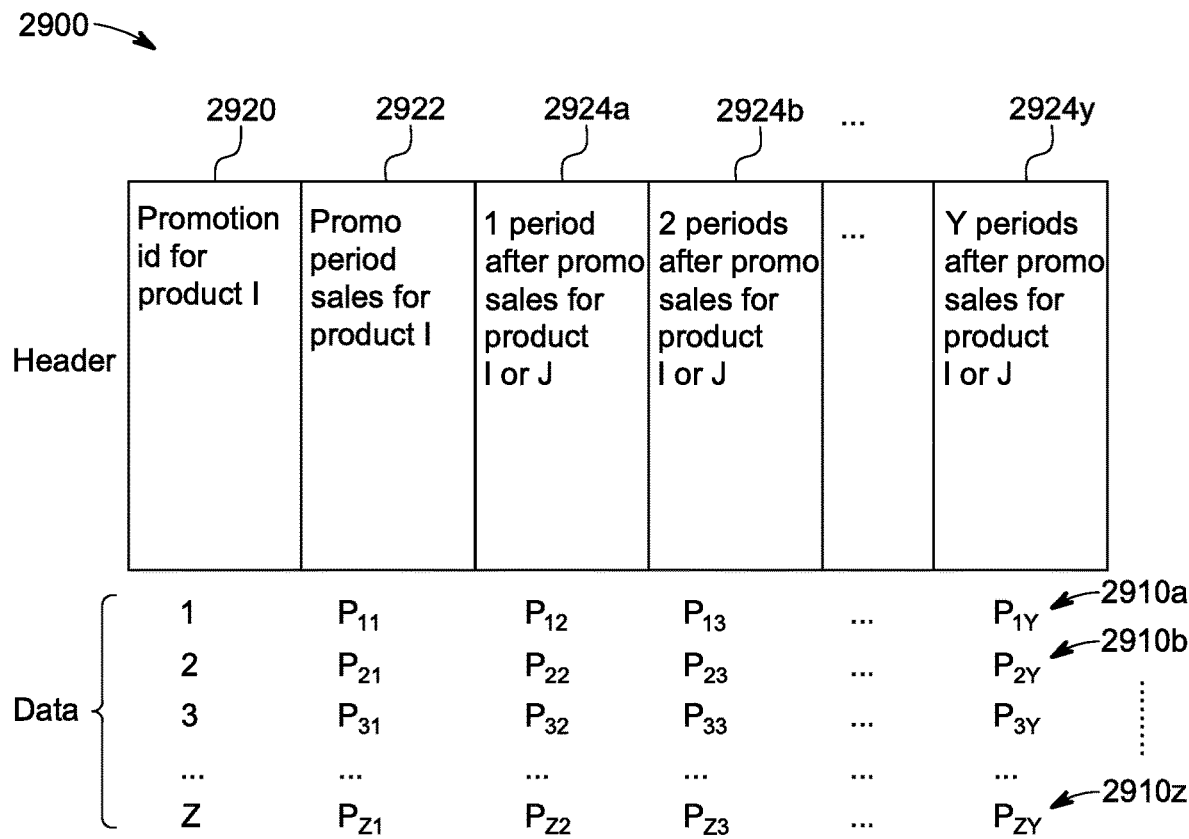

P typically represents the period Sales, margin, margin % or transactions
When using product J for periods 1 to Y, the calculation is for cross-product cannibalization
When using product I for periods 1 to Y the calculation if for product cannibalization
Z represents the number of times in history that a product has been promoted Data Set for Computing Cannibalization Cadence and Magnitude

FIG. 29

Exemplary Scaling Curve for Increasing Number of Products Promoted within a Hierarchy Sub-Tree

| Period | Actual sales or gross margin or transactions | Predicted sales or gross margin or transactions using equation 1 | Feature #1 component of the mathematical theory | Feature #2 component of the mathematical theory | ... | Feature #N or component of the mathematical theory |
|---|---|---|---|---|---|---|
| 1 | $Y_1$ | $\hat{Y}_1$ | $X_{11}$ | $X_{12}$ | ... | $X_{1N}$ |
| 2 | $Y_2$ | $\hat{Y}_2$ | $X_{21}$ | $X_{22}$ | ... | $X_{2N}$ |
| 3 | $Y_3$ | $\hat{Y}_3$ | $X_{31}$ | $X_{32}$ | ... | $X_{3N}$ |
| ... | ... | ... | ... | ... | ... | ... |
| Z | $Y_Z$ | $\hat{Y}_Z$ | $X_{Z1}$ | $X_{Z2}$ | ... | $X_{ZN}$ |

Period is typically a promotional week although it could be of shorter or longer duration. There are Z periods of historical data in this example
$Y_i$ represents the actual value of the metric of interest from historical data
$\hat{Y}_i$ represents the predicted value of the metric of interest using the historical data and Equation (1)
$X_{11}$ through $X_{zn}$ represents the features and components in the mathematical theory Data Set for Searching for the Optimal Control Policy

FIG. 31

| Header | Future period | Actual sales or gross margin or transactions | Predicted sales or gross margin or transactions using equation 1 | Feature #1 component of the mathematical theory | Feature #2 or component of the mathematical theory | ... | Feature #M or component of the mathematical theory | Solution vector component 1 to m |
|---|---|---|---|---|---|---|---|---|
| | | 3210 | 3220 | 3222a | 3222b | | 3222m | 3230 |
| Periods to find optimal control policy | 1 | Unknown | $\hat{Y}_1$ | $X_{11}$ | $X_{12}$ | ... | $X_{1M}$ | $x_j(1); j=1...m$ |
| | 2 | Unknown | $\hat{Y}_2$ | $X_{21}$ | $X_{22}$ | ... | $X_{2M}$ | $x_j(2); j=1...m$ |
| | 3 | Unknown | $\hat{Y}_3$ | $X_{31}$ | $X_{32}$ | ... | $X_{3M}$ | $x_j(3); j=1...m$ |
| | ... | ... | ... | ... | ... | ... | ... | ... |
| | N | Unknown | $\hat{Y}_Z$ | $X_{N1}$ | $X_{N2}$ | ... | $X_{NM}$ | $x_j(M); j=1...m$ |

Period is typically a promotional week although it could be shorter or longer duration. There are N periods of optimal actions to plan
$Y^*_i$ represents the predicted value of the metric of interest using the historical data and Equation (1)
$X_{11}$ through $X_{ZM}$ represents the features and components in the mathematical theory
The $x_j(t); j=1...m$ are the control inputs in Equation (1) to be optimized Data Set for Using the Optimal Control Policy to Define Optimal Control Inputs

FIG. 32

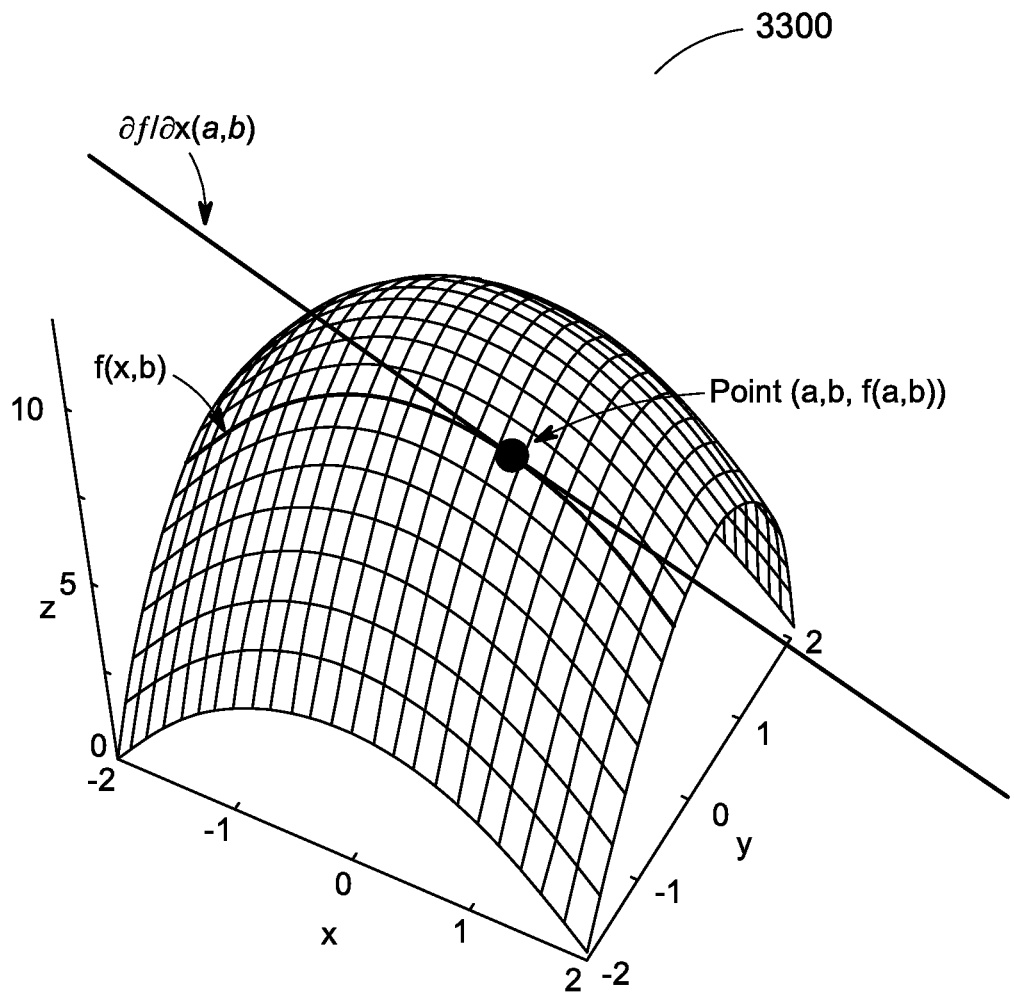

From the optimal solution (optimal number of lines per category) we calculate what solution change results from a change to the number of sub-categories in any one category The partial derivatives for every category for a "+1" and "-1" change in number of sub-categories are calculated This increment is calculated from the output of the category level equation and fed into the sub-category level equation The category level increments are decomposed to the sub-category level based on the fraction of sales each line contributes to the category Calculating the Incremental Value of Adding or Subtracting more Promotion Items Using Partial Differentiation

FIG. 33

SYSTEM AND METHOD FOR SELECTING PROMOTIONAL PRODUCTS FOR RETAIL

RELATED APPLICATIONS

The present invention is a U.S. divisional patent application of U.S. patent application Ser. No. 15/795,821 filed on 27 Oct. 2017, claiming priority to Canadian Patent Application No. 2,982,930 filed on 18 Oct. 2017, the entire contents of each of which are hereby incorporated herein by reference.

FIELD OF THE INVENTION

The present invention relates to computer systems and more particularly, to a system and method for retain merchandise planning and forecasting.

BACKGROUND OF THE INVENTION

In the art, retailers generally do not use sophisticated analysis to plan sales or product promotions. Promotional products are typically selected based on the following factors: (1) manufactures offering products at a discounted cost to the retailer, and/or discounted cost of products in exchange for advertising executed by the retailer; (2) seasonal themes driving intuition based product selection; for example, summer is BBQ season, and therefore barbeques, barbeque meats and the like, are promoted; (3) promotions and discounts to clear excess of left-over product inventory; (4) historical high sales performance of products and the offering of these products with the expectation of repeat high sales performance. It is common place for promotions to include approximately 80-90% of the same products year over year, where retailers do not have the time and/or tools to do any in depth analysis.

It has been found that the majority of retailers fail to take in account one or more of the following factors or mechanisms or historical events: (1) "cannibalization"; (2) cadence; (3) associated/halo sales; (4) promotional elasticity; (5) forward buying/pantry Loading; (6) performance of recent and historical promotions and regular sales; (7) impact on long term performance of a sequence of promotions.

Cannibalization occurs when a product on promotion affects the sales of other first or second degree related products during the same promotion period.

Cadence is the time between when the item was last promoted and the currently intended promotion. Future item demand can be affected by "pantry loading" caused by customers stocking up on promoted items and the product lifecycle.

Associated/Halo sales occur when other products are bought in the same transaction as the promoted products. The associated or halo products typically complete a product use case for the promoted item.

Promotional Elasticity is the impact of the promotional type and placement of item within the promotional advertising which impacts the sales of the promoted over its non-promoted baseline sales Forward buying/Pantry Loading occurs where the promoted product sales affect its own future sales due to "pantry loading", i.e. buying extra by customers, as well as affecting the future sales $1^{st}$ and $2^{nd}$ degree related products.

Performance of recent and historical promotions and regular sales is the time series impact of recent item and $1^{st}$ and $2^{nd}$ degree related items on total sales included both promoted and non-promoted in currently planned week.

Impact on long term performance of a sequence of promotions can occur when retailers consider one promotion at a time and do not consider the impact of a sequence of promotions on the total sales over a period of time.

Accordingly, there remains a need for improvements in the art.

BRIEF SUMMARY OF THE INVENTION

The present invention is directed to a method and system for merchandise planning and forecasting in a retail application.

According to one embodiment, the present invention comprises a computer system for generating an electronic retail plan for a retailer, said computer system comprising, a data staging module, said data staging module being configured to input retail sensory data from one or more computer systems associated with the retailer; a data processing module, said data processing module being configured to pre-process said inputted retail sensory data; a data warehouse module configured to store said inputted retail sensory data and said pre-processed retail sensory data; a state model module configured to generate a retailer state model for modeling operation of the retailer based on said retail sensory data; a calibration module configured to calibrate said state model module according to one or more control parameters; and an output module for generating an electronic retail plan for the retailer based on said retailer state model.

According to another embodiment, the present invention comprises a computer-implemented method for generating an output retail plan for a retailer, said computer-implemented method comprising, inputting sensory data from a computer system associated with the retailer; determining a plurality of actionable features and a plurality of non-actionable features based on said inputted sensory data; selecting one or more of said features wherein said features are selected according to a relevant period of time; generating a system model for the retailer, wherein said system model is configured to model operating states of the retailer; utilizing said system model to generate a plurality of operating states over multiple periods, wherein each of said operating states comprises a simulated retail plan for the retailer; applying one or more optimization parameters to select one of said simulated retail plans; selecting one of said simulated retail plans and generating an electronic retail plan; and outputting said electronic retail plan to a computer system associated with the retailer.

According to another aspect, the present invention comprises a non-transitory computer-readable storage medium with an executable program stored thereon, wherein the program instructs a processor to perform the following steps: inputting sensory data from a computer system associated with the retailer; determining a plurality of actionable features and a plurality of non-actionable features based on the inputted sensory data; selecting one or more of the features wherein the features are selected according to a relevant period of time; generating a system model for the retailer, wherein the system model is configured to model operating states of the retailer; utilizing the system model to generate a plurality of operating states over multiple periods, wherein each of the operating states comprises a simulated retail plan for the retailer; applying one or more optimization parameters to select one of the simulated retail plans; selecting one of the simulated retail plans and generating an electronic retail plan; and outputting the electronic retail plan to a computer system associated with the retailer.

Other aspects and features of the present invention will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example, embodiments of the present invention, and in which:

FIG. 10B shows a screen shot of an exemplary output retail plan generated according to an embodiment of the present invention;

FIG. 17 shows a transaction receipt indicating specific examples of sales segmentation;

FIGS. 18A to 18C show an association rule mining function based on the aprioriTID algorithm;

FIG. 19 shows an Affinity Matrix according to an embodiment;

FIG. 23 shows a cannibalization matrix in accordance with an embodiment of the present invention;

FIG. 28 shows a cannibalization matrix for determining cannibalization over time according to an embodiment of the present invention;

FIG. 29 shows a data set for determining cannibalization cadence and magnitude according to an embodiment of the present invention;

FIG. 31 shows a data set configured for determining an optimal control policy according to an embodiment of the present invention;

FIG. 32 shows a data set configured for utilizing the optimal control policy for determining optimal control inputs according to an embodiment of the present invention; and FIG. 33 shows in diagrammatic form a process for determining the incremental value of adding or removing promotional products or items.

Like reference numerals indicate like or corresponding elements or components in the drawings.

DETAILED DESCRIPTION OF THE EMBODIMENTS OF THE INVENTION

Figure 1:
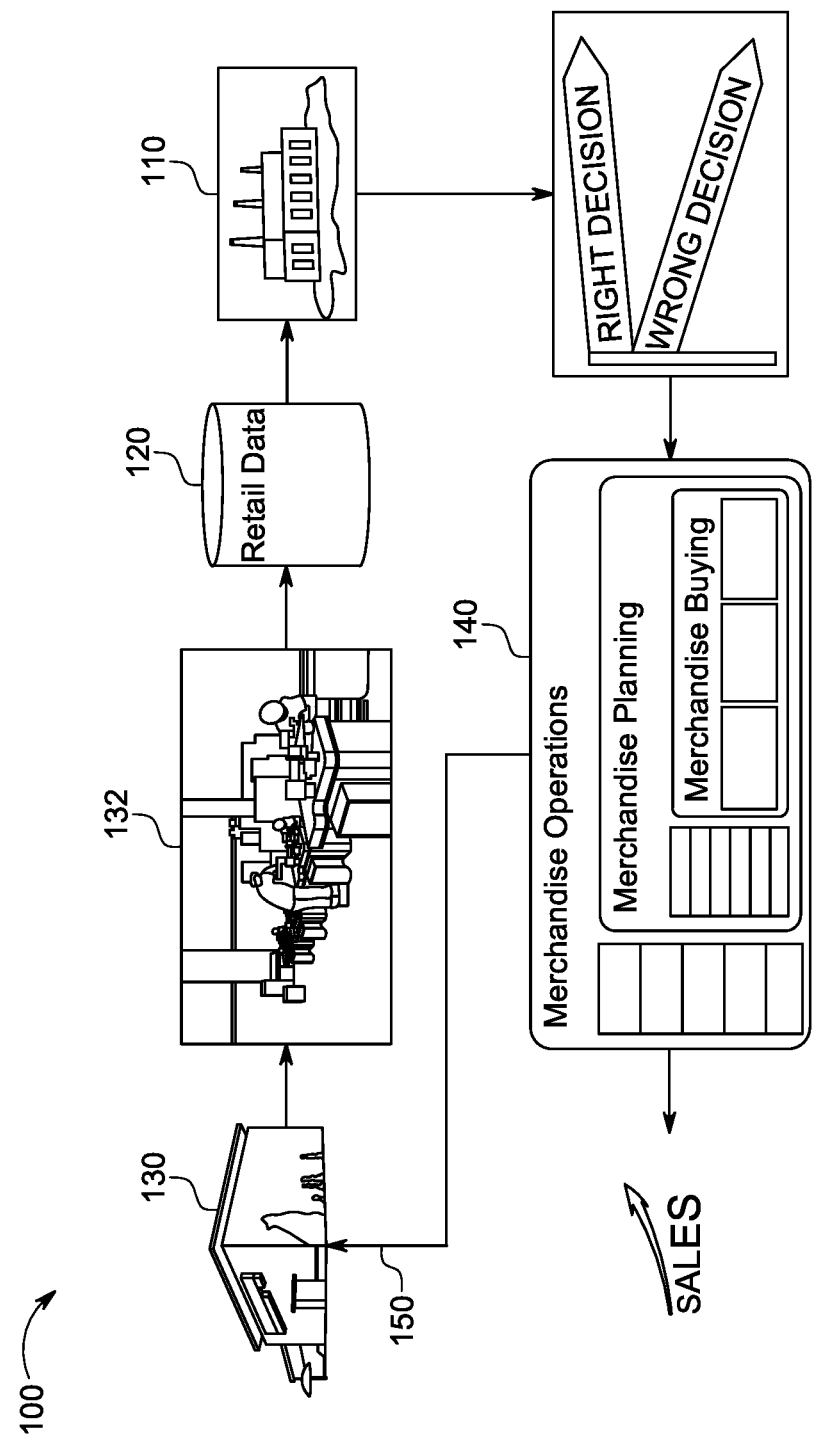
FIG. 1 shows in diagrammatic form a retail merchandise planning system with closed loop control according to an embodiment of the present invention.

Reference is made to FIG. 1, which shows in diagrammatic form a retail merchandise planning system according to an embodiment of the present invention and indicated generally by reference 100. As shown in FIG. 1, the retail merchandise planning system 100 comprises a computing and processing facility, indicated generally by reference 110, which receives or inputs retail data 120 from one or more retailers 130. The retailers comprise traditional "brick and mortar" retailers in addition to web-based retailers or entities. The data is collected from retail point-of-sale machines or through ecommerce sites, indicated generally by reference 132. The retail data 120 inputted by the computing and processing facility 110 includes customer data, transaction data, price data, promotion data. As will be described in more detail below, the computing and processing facility 110 comprises computers and/or processors implemented in hardware and/or software configured to process the retail data and generate retail merchandise operational plans, sales/margins results measurements and forecasts, and a retailer merchandise plan tailored for one or more of the retailers. According to another aspect, the retail merchandise planning system 100 comprises a closed loop control indicated by reference 150. The closed control loop 150 is configured to provide a feedback loop which is utilized to optimize control inputs and/or the retail merchandise plan, as described in more detail below.

Figure 2:
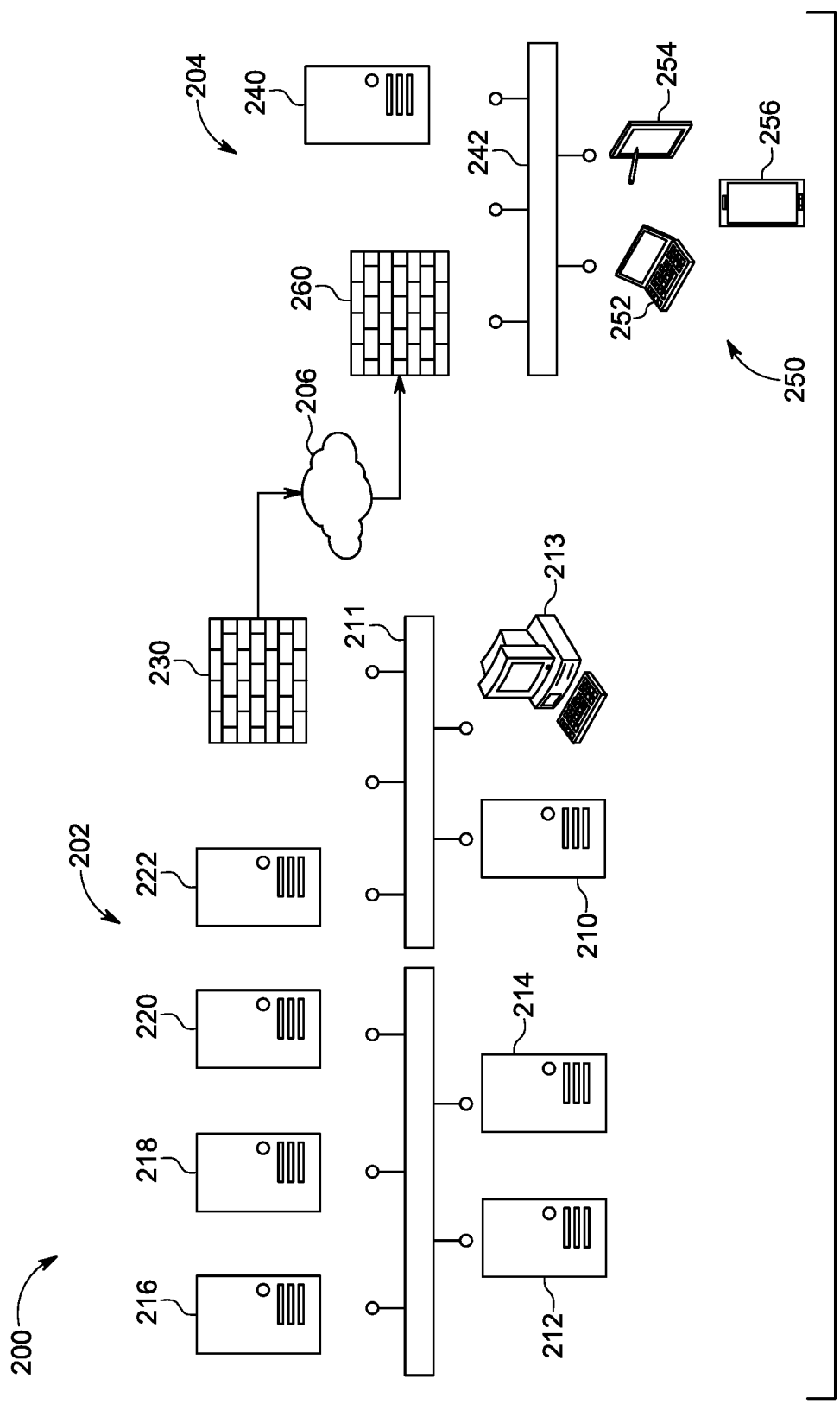
FIG. 2 shows a computer hardware system architecture for the retail merchandize planning system of FIG. 1 according to an embodiment of the present invention.

Reference is next made to FIG. 2, which shows an overall computer and hardware infrastructure or architecture for an exemplary implementation of the retail merchandise planning system 100, and indicated generally by reference 200. The computer hardware infrastructure 200 comprises a retail merchandise planning computer system or facility indicated by reference 202 and a retailer computer system indicated by reference 204. The retail planning computer system 202 comprises a control server 210, a data warehouse server 212, a web server 214, an ETL ("Extract, Transform, Load") server 216, a reporting server 218, a computational server farm 220 and a metadata server 222, as described in more detail below. The computer servers are operatively coupled through a network, or other communication mechanism, for example, an Ethernet network, and indicated generally by reference 211. The retailer computer system 204 comprises retailer operational or computer systems indicated generally by reference 240 which is operatively coupled through a retailer (i.e. client) network 242 to a plurality of computers, or other appliances 250, comprising, for example, a user laptop or desktop computer 252, user tablets (e.g. Apple iPads) 254, and/or smart phones and other mobile devices 256. As shown in FIG. 2, the retail planning computer system 202 is coupled to the retailer computer system 204 through the Internet 206. As also shown in FIG. 2, the retail planning computer system 202 interfaces to the Internet through a VPN (Virtual Private Network) Firewall, and similarly the retailer computer system 204 connects to the Internet 206 through a client VPN firewall 260. Each of the servers comprises computer hardware operating under stored programmed control, computer code and/or software to perform the processes and functions associated with core computer system functions, and the processes and operations according to embodiments of the present invention as described in more detail herein. The particular implementation details will be within the understanding of those skilled in the art of computers and computer programming.

Referring still to FIG. 2, the control server 210 includes an administrative console (for example, a desktop or laptop computer) 213 for accessing and configuring the control server 210. The control server 210 is configured to execute processes and functions associated with an intelligent agent module 400 (FIG. 4), as described in more detail below, and also with reference to FIGS. 3, 5 and 7.

The data warehouse server 212 is configured to store raw and processed sensor data and forms, i.e. comprising retail data 120 obtain from the retailers 130. According to another aspect, the data warehouse server 212 provides a long-term memory module or component for the intelligent agent module 400 (FIG. 4), as described in more detail below.

The Web server 214 is configured to deliver a retail merchandising plan, generated according to one aspect of the present invention, to the retailer computer system 204, and for example, to one or more of the user devices or appliances 250. The retail merchandising plan is delivered by the Web server 214 through the firewall 230 and the Internet 206.

The ETL server 216 comprises a computer server or a plurality of servers, i.e. cluster of servers, and is configured to execute data processing jobs or operations associated with sensor data obtained from the retailer environment 130 (FIG. 1). The output generated by the ETL server 216 populates a long-term memory component 414 in the intelligent agent module 400 (FIG. 4) and a state measurement component 430 in the intelligent agent module 400 (FIG. 4).

The reporting server 218 is configured to execute a process or operations to display a new state and/or reward that occurs in the retail environment 130 (FIG. 1) based on the processing executed by the state measurement component 430. The reporting server 218 utilizes sensor input data 410 (FIG. 4) which is processed and received from the ETL server 216 (FIG. 2).

Figure 4:
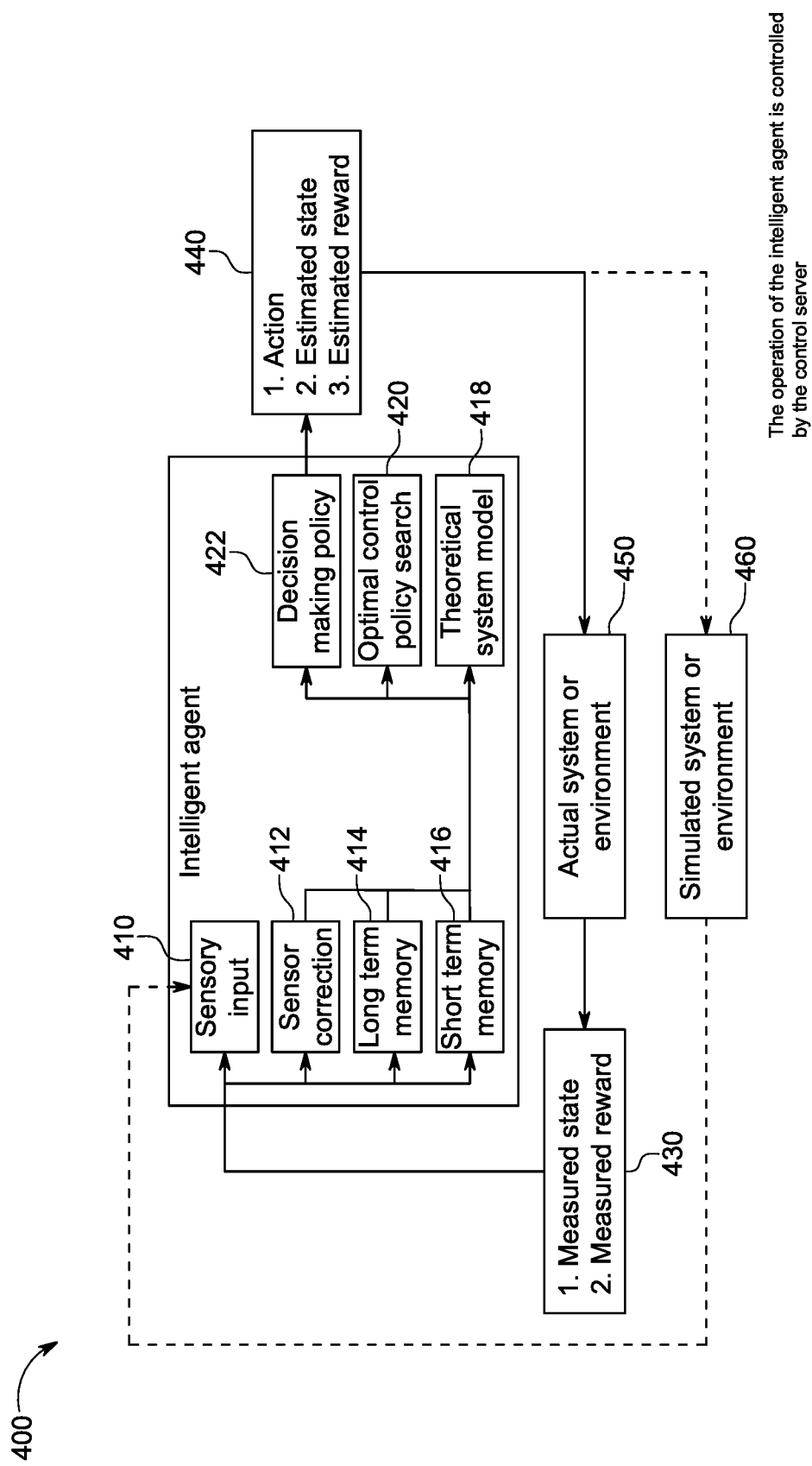
FIG. 4 shows in diagrammatic form an intelligent agent module for the retail merchandise planning system of FIG. 1 according to an embodiment of the present invention.

The computational server 220 is configured to execute processes or operations utilized to fit a retail environment theoretical model 418 (FIG. 4), processes to define a policy for retail actions or operations 422 (FIG. 4). The computational server 220 is further configured to apply the policy as indicated by 440 in FIG. 4. The computational server 220 is also configured to store results of executing policy information as short term memory 416 in FIG. 4.

The metadata server 222 is configured to execute processes or operations for storing configuration data that is used by the control server 210 to execute processes and functions associated with the operation of the intelligent agent module 400, as described in more detail below.

Reference is next made to FIG. 4 which shows the intelligent agent module 400 according to an embodiment of the present invention. The intelligent agent module 400 is configured to operate in the environment of the retailer(s) or ecommerce sites 130 (FIG. 1) and according to system states of the retailer environment 130. The system state is defined by time series data inputted and processed by the retail merchandise planning system 100, and where the time series data comprises data typically collected by a retailer in real-time from its computer and operational systems.

According to an exemplary embodiment, the intelligence agent module 400 is configured to operate in two environments or modes: an actual or operational control loop and a simulated control loop. The actual control loop operates in an actual real-world environment and inputs/processes periodic measurement data. The simulated control loop, on the other hand, is configured to operate in a simulated environment where the estimated state and estimated rewards or benefits are used as a proxy for actual measurements. According to another aspect, the system is further configured to utilize actual measurements to correct the estimated state every N simulations.

As shown in FIG. 4, the intelligent agent module 400 comprises the following components: a sensory input component 410, a sensor correction component 412, a long-term memory component 414, a short-term memory component 416, a theoretical system module component 418, an optimal control policy search component 420, and a decision making policy component 422. The control server 210 is configured to control the operation of the intelligent agent module 400. The intelligent agent module 440 comprises an action output module 440. According to an exemplary embodiment, the action output module 440 is configured to generate an action plan, an estimated state for the retailer environment and/or an estimated reward for the retailer environment. The intelligent agent module 400 is further configured to apply the action output to the actual retailer system or environment as indicated by reference 450. According to another aspect, the intelligent agent module 400 is configured to input or measure state parameters and/or reward parameters of the retailer system or environment in response to the application of the action plan, as indicated by reference 430 in FIG. 4, and described in more detail below. According to another aspect, the intelligent agent module 400 is configured with a simulation control loop. The simulation control loop 460 is configured to apply the action plan 440 to a simulated system or environment 460, and the response of the simulated system or environment is inputted by the sensory input component 410 and processed by the intelligent agent module 400.

Figure 3:
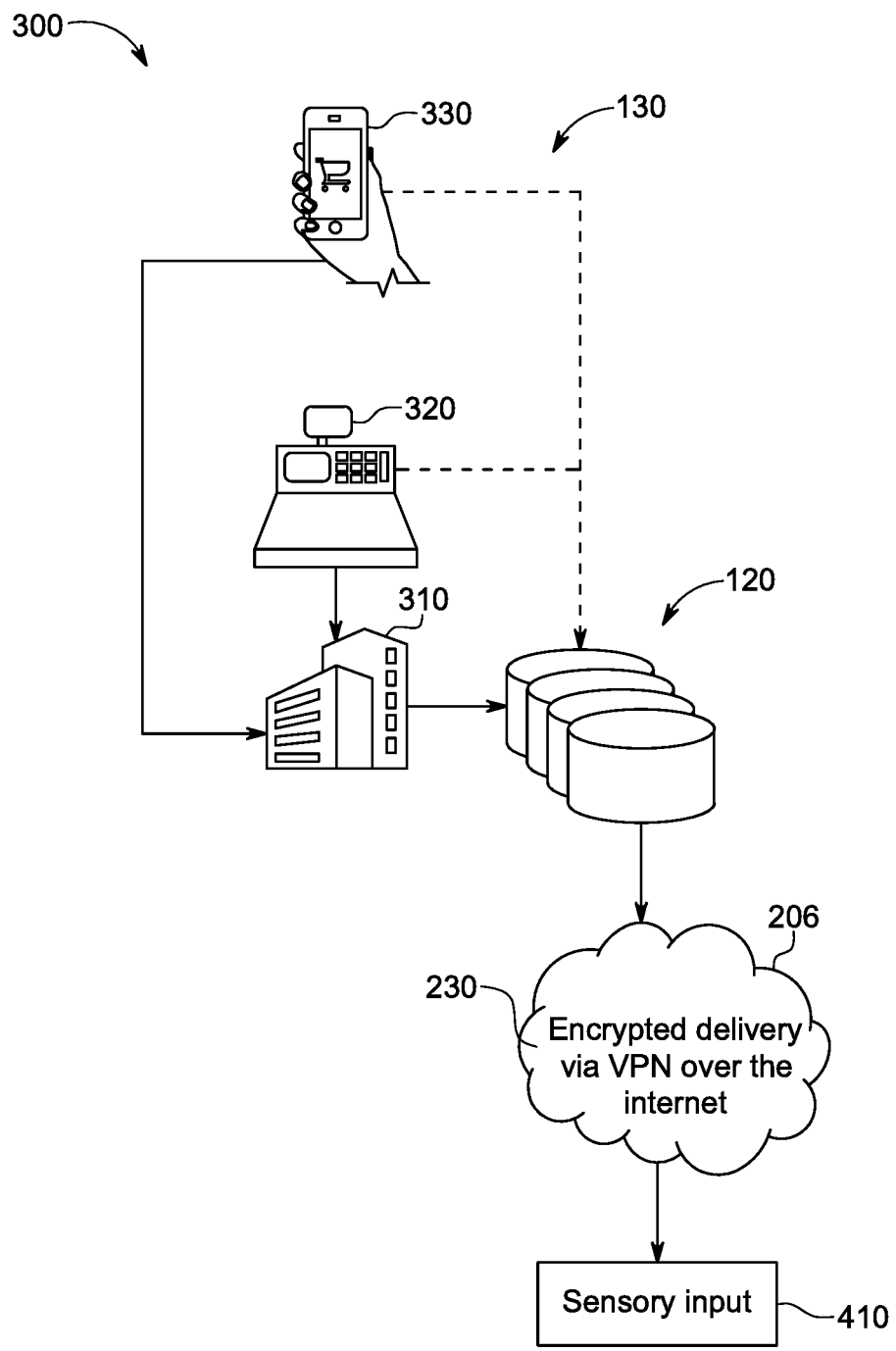
FIG. 3 shows in diagrammatic form data flow from retail entities to the retail merchandise planning system according to an embodiment.

The sensor input component 410 is configured to collect the raw data received from the retail environment, i.e. the retailer or ecommerce site. The sensor data is collected or inputted as depicted in FIG. 3. In the retailer environment 130, data comprising retail point-of-sale 320 and/or e-commerce point-of-sale data 330 is collected and stored in one or more computer systems 240 (FIG. 2) at a data or computer centre 310 for the retailer 130. The collected data is packaged and transmitted in real-time and/or as batch data extracts 120 to the sensory input component 410 at the intelligent agent module 400 via the client VPN firewall 260 and the Internet 206.

According to another aspect, the intelligent agent module 400 is configured to input the data from the retail environment on a periodic basis, for example, in near real-time, intra-daily, daily, intra-weekly or weekly. According to an exemplary implementation, the data inputted from the retailer environment comprises:

(1) POS receipts data for several years—TLOG (transactions, receipts, data)
 (a) Transaction identifier
 (b) Sequence Number
 (c) Customer Identifier
 (d) Date
 (e) Time
 (f) Store identifier
 (g) Product Identifier
 (h) Promo Identifier
 (i) Unit Price (or price per weight)
 (j) Unit Cost (or cost per weight)
 (k) Quantity (integer for countable items, fractional for weighted items)
 (l) Extended Sale Amount
(2) Promotion Master for same data range as TLOG
 (a) Promotion identifier
 (b) Promotion start and end data
 (c) Promotion Type
 (d) Promotion Marketing Channel
(3) Promotion Product Master for same date range as TLOG
 (a) Promotion Identifier
 (b) Product Identifier
 (c) Store Identifier
 (d) Product placement identifier
  (i) Circular page identifier
  (ii) Page location identifier
  (iii) Planogram location identifier
  (iv) Website location identifier
  (v) Etc.
(4) Promotion Product Customer for same date range as TLOG
 (a) Promotion identifier
 (b) Product Identifier
 (c) Customer Identifier
(5) Product Master
 (a) Product Identifier (UPC or PLU)
 (b) Product Description
 (c) Product Attributes
  (i) Brand
  (ii) Packaging
  (iii) Size
  (iv) Ingredients
  (v) Warnings
  (vi) Images
(6) Product Hierarchy 1
 (a) Line of Business
 (b) Department
 (c) Sub-Department
 (d) Category
 (e) Subcategory
 (f) Product Identifier
(7) Product Hierarchy 2
 (a) Ad Group Identifier
 (b) Item Identifier
 (c) Product Identifier
(8) Store Master
 (a) Store Identifier
 (b) Store Full Address
 (c) Store Longitude/Latitude
 (d) Store Square Footage
 (e) Planogram Identifier
 (f) Store Type
(9) Planogram
 (a) Planogram identifier
 (b) Planogram location
 (c) Planogram sub-location
 (d) Product identifier
 (e) Planogram Image
 (f) Start Date
 (g) End Date
(10) Store Groupings
 (a) Store Cluster Identifier
 (b) Store Cluster Description
 (c) Start Date
 (d) End Date
 (e) Store Identifier
(11) Time
 (a) Date
 (b) Calendar Week (ISO)
 (c) Calendar Month (ISO)
 (d) Calendar Year
 (e) Fiscal Week
 (f) Fiscal Month
 (g) Fiscal Year
 (h) Promo Week
 (i) Promo Year According to an exemplary configuration, the sensory input component 410 is configured to execute data warehousing operations in the collection, correction and/or management of data inputs. The sensor input data is stored in the long-term memory component 412, i.e. for a data warehouse, and in the short-term memory component 414, i.e. for data mart(s), or recent control actions and/or control action candidates, as described in more detail below As shown in FIG. 4, the intelligent agent module 400 also comprises, according to an embodiment, the following components: a sensor correction component 412; a long-term memory component 414; a short-term memory component 416; a theoretical system model component 418; an optimal control policy search component 420; and a decision making policy component 422.

The sensor correction component 412 is configured to correct or adjust the sensor inputs for "measurement noise". In simulated control loop operation, the sensor correction component 412 is configured to correct the simulated state of the environment with an actual state measurement.

The theoretical system model component 418 is configured to execute a retail system planning process that governs the behavior and operation of the retail merchandise planning system dynamically and in equilibrium, as will be described in more detail below.

The long-term memory component 414 is configured to provide functionality and store data for use by the retail system planning process having a longer term frequency response and/or historical control actions.

The short-term memory component 416 is configured to provide functionality and store data for the retail system planning process having a shorter term frequency response and/or recent control actions.

The optimal control policy search component 420 is configured to utilize the current and historical states of the retailer or retail environment and the retail system planning process to generate an optimal control policy or plan that sufficiently maximizes long-term reward or merchandising goals for the retailer and maintains stable control in the intelligent agent module 400.

The decision making policy component 422 is configured to utilize the output of the optimal control policy component 420 to search and select a stable next action which can be executed given the current state of the long-term memory component 414 and/or the short-term memory component 416.

Figure 5:
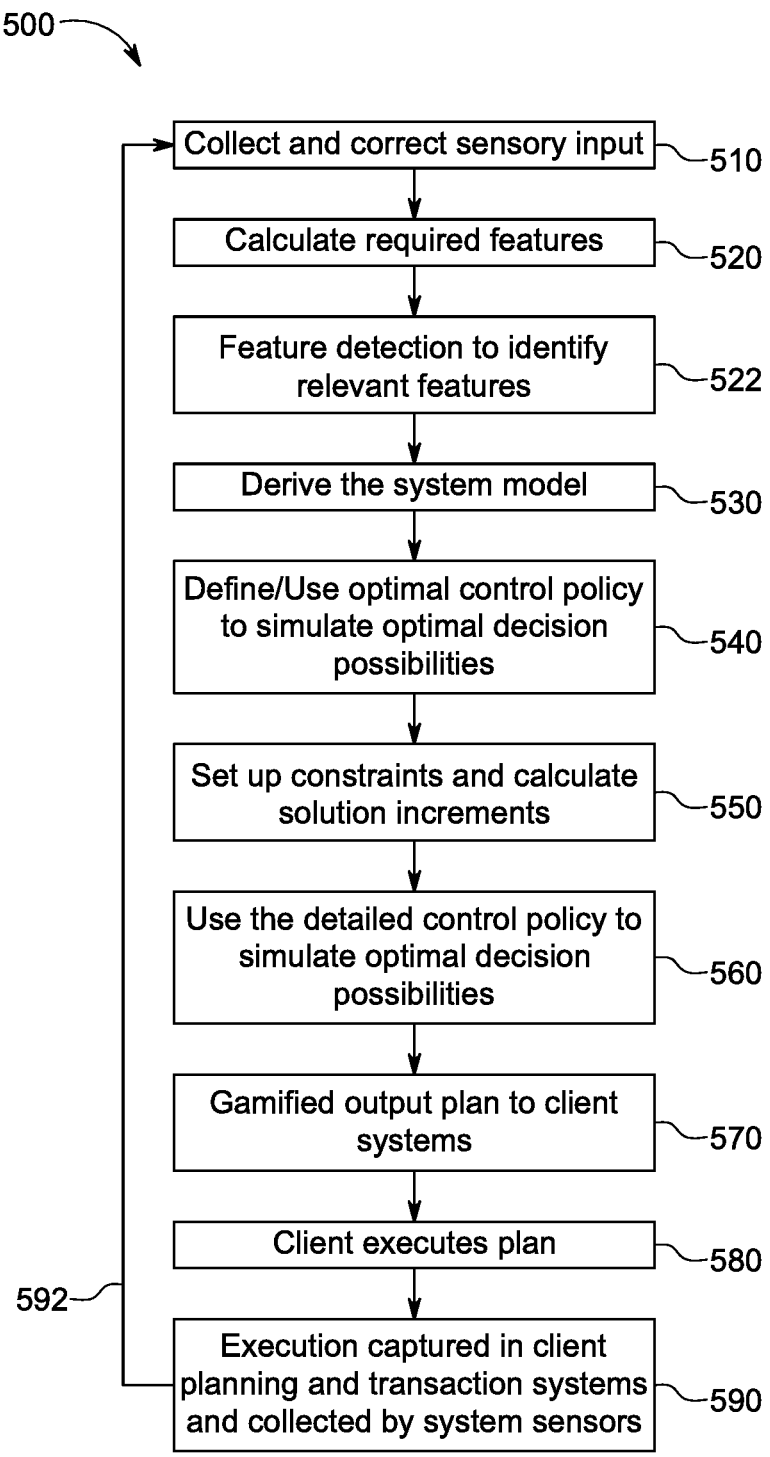
FIG. 5 shows in flowchart form a processing sequence executed by the intelligent agent module according to an embodiment of the present invention.

Reference is next made to FIG. 5, which shows a retail merchandise planning process configured for execution by the intelligent agent module 400, according to an embodiment of the present invention and indicated generally by reference 500.

The first step in the retail planning process 500 comprises collecting and/or correcting data inputted at the sensory input component 410 in the intelligent agent module 400, as indicated by reference 510 in FIG. 5. Collecting and correcting sensory input 510 comprises executing data management data flows; executing holiday adjustments, comparable store adjustments and de-trends, as described in more detail below.

Figure 12:
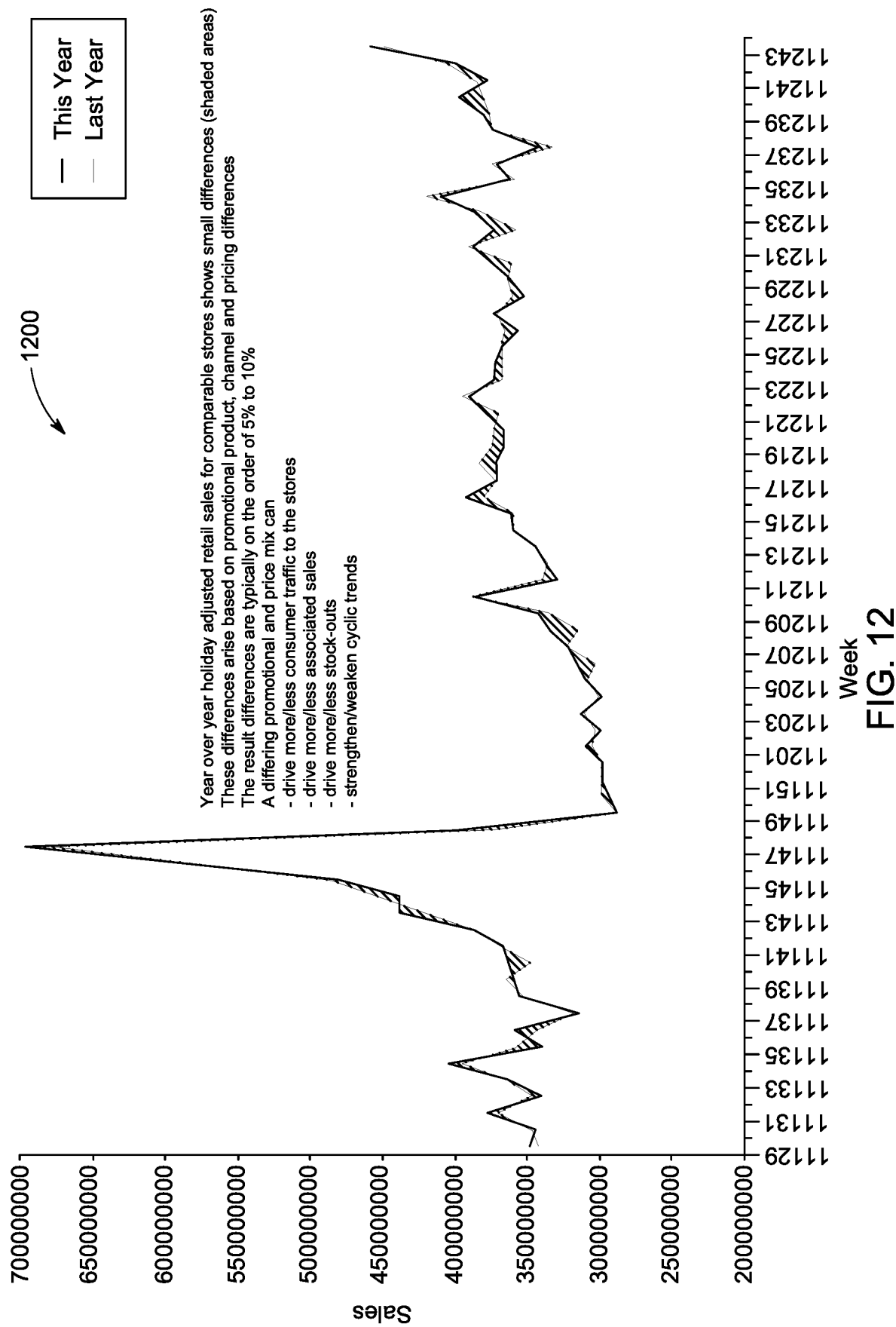
FIG. 12, which shows a graphical representation of sales year over year for an exemplary retailer or retail environment.

Reference is made to FIG. 12, which shows a graphical representation 1200 of sales year over year for an exemplary retailer or retail environment. In particular, the graphical representation 1200 shows how retail sales conceptually vary year over year. It will be appreciated that one reason for comparable store year over year variation is the year over year and period over period variation in promotional activity. For instance, important periods in retail are typically within an 8 week, a 13 week, a 26 week and 52 week periods. For the exemplary graph shown in FIG. 12, year over year holiday adjusted sales for comparable stores show small differences. According to an embodiment of the present invention, such differences can be determined in terms of promotional product, channel and/or pricing differences. According to another aspect, determining differing promotional product(s) and pricing combinations or mixes can result in more/less consumer traffic to a retailer's store(s), more/less associated sales, more/less stock-outs and/or strengthen/weaken cyclic trends.

Figure 13:
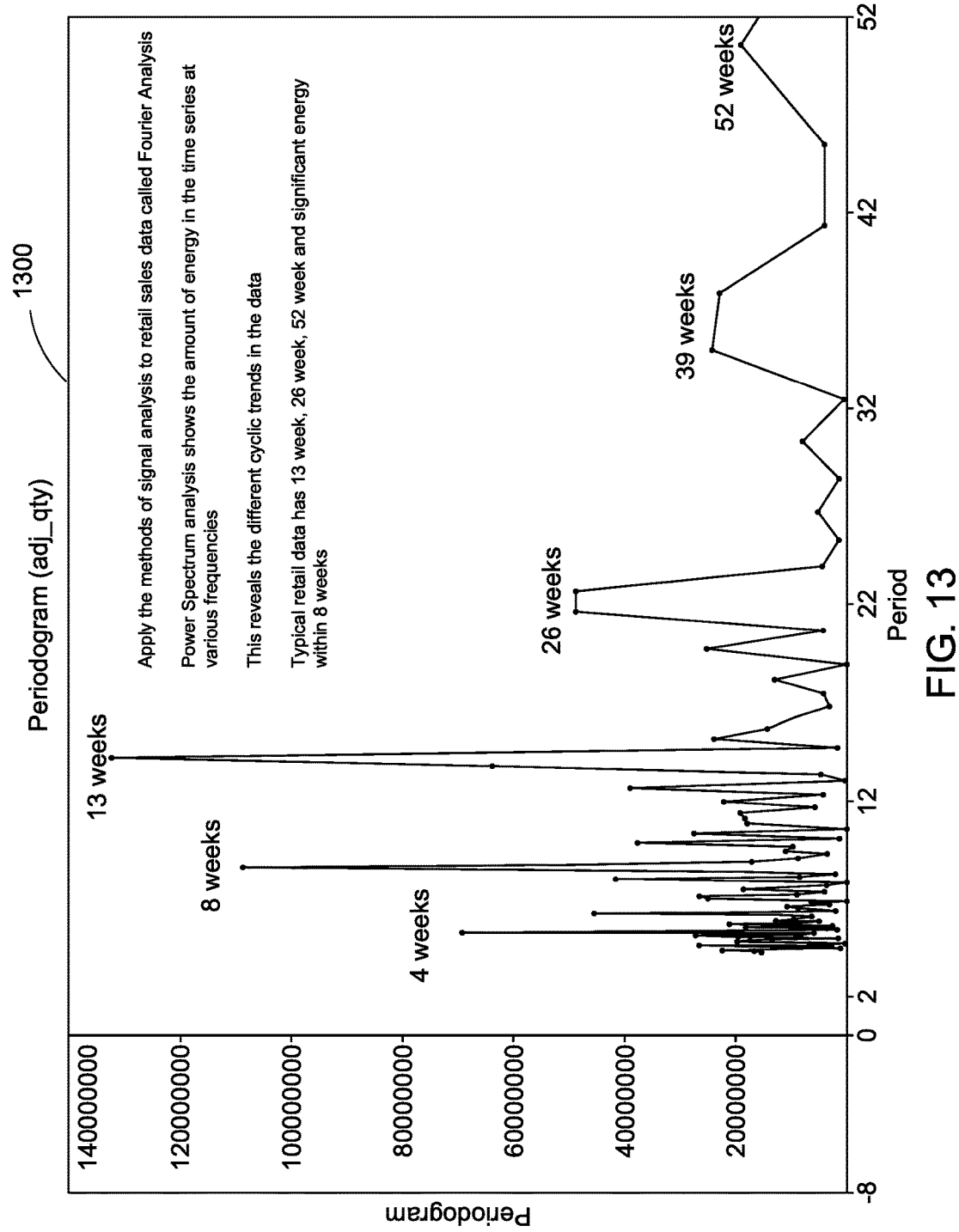
FIG. 13 shows a power spectrum representation of a typical retail time series showing the time cycles that affect current sales.

FIG. 13 shows a power spectrum representation of a typical retail time series showing the time cycles that affect current sales. In accordance with one aspect, signal analysis (i.e. Fourier Transform analysis) is applied to retail sales data. The power spectrum that is generated shows the amount of energy in the time series at various frequencies, which reveals different cyclic trends in the retail sales data and history, i.e. time cycles that affect current sales. As shown in FIG. 13, the retail data for the retailer has peaks at 13 weeks, 26 weeks and 52 weeks, and a significant energy peak at 8 weeks.

Figure 14:
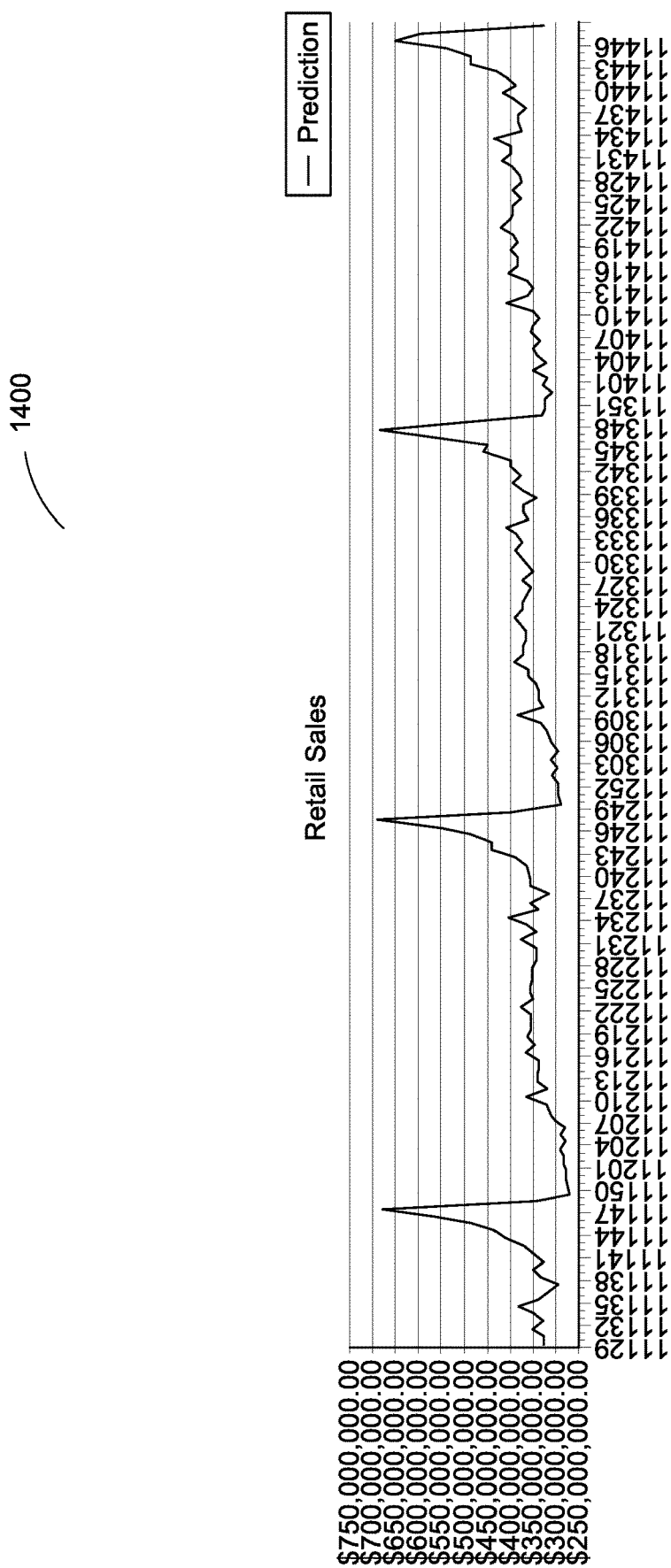
FIG. 14 shows a graphical representation of a stationary retail time series with weekly level of time aggregation.

FIG. 14 shows a graphical representation of a stationary retail time series with weekly level of time aggregation and indicated generally by reference 1400. According one aspect, the retail time series is made stationary by using comparable store sales to minimize the year over year trend, i.e. remove gross or aberrant trends in the data. If a strong trend exists then further de-trending is a first order difference is warrant i.e. $d_t = S_t - S_{t-1}$ where $d_t$ is the difference at time t and $S_t$ is the comparable store sales at time t, where the time scale would be related to the key power spectrum peaks. In the case, where the first order de-trending is utilized all further computation would be based on the difference $d_t$. According to another aspect, analysis is executed against sales/profits/transactions for a "comp store" or comp store group, wherein a "comp store" is store that was constant during the period of analysis. The data is also adjusted for holidays as described in more detail below.

Figure 15:
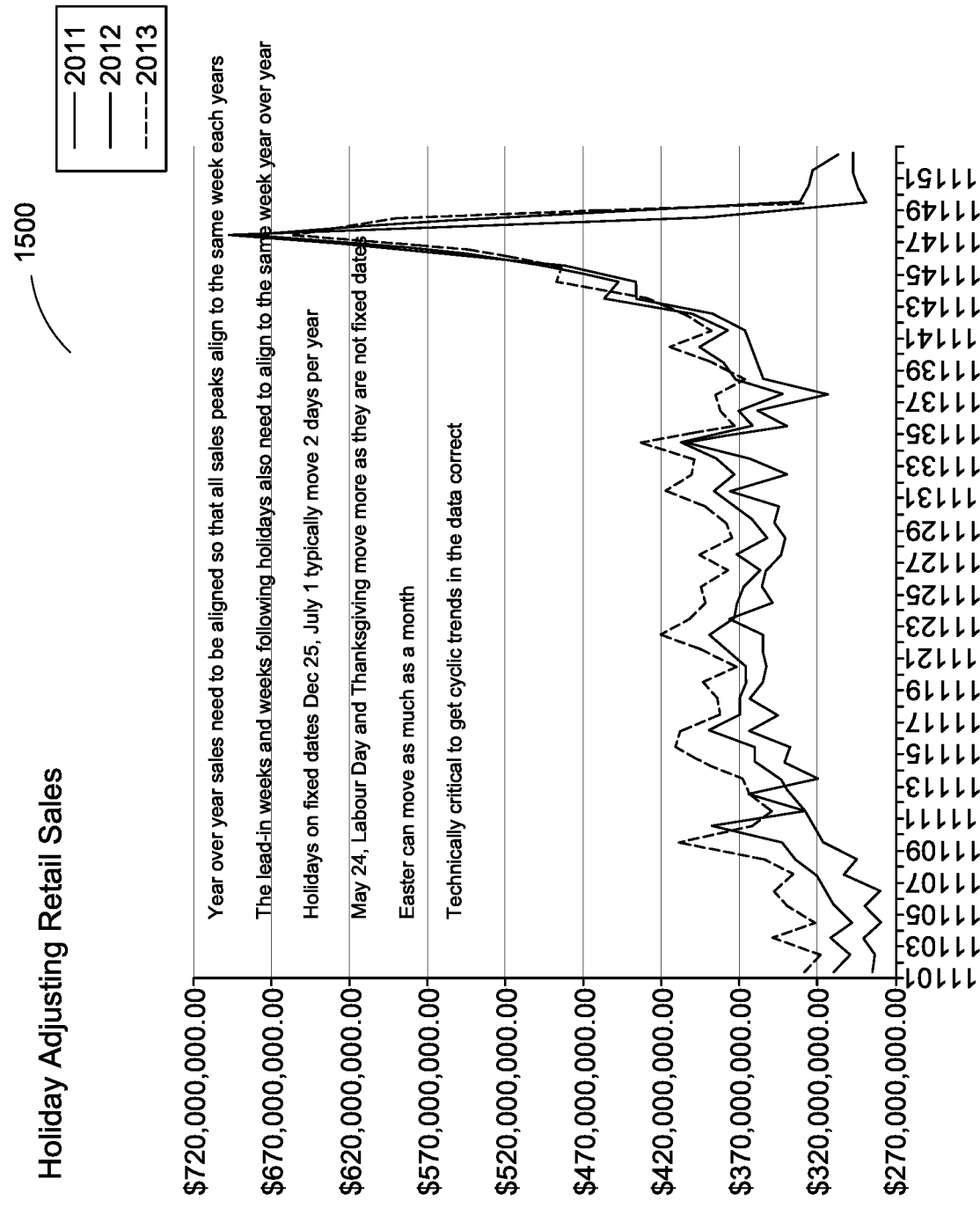
FIG. 15 shows a graphical representation of a holiday adjustment for typical year over year retail sales and the misalignment of key holidays.

According to another aspect, the retail merchandise planning process includes a holiday adjustment function or process. FIG. 15 shows a graphical representation 1500 of typical year over year retail sales and the misalignment of key holidays. Holidays on fixed dates, i.e. December 25, July 1, July 4, typically move or shift 2 days per year. Holidays such as May 24, Labour Day and Thanksgiving can move as they are not fixed dates. The Easter holiday, in turn, can move as much as a month from year to year. Accordingly, a holiday adjustment process is provided and configured to generate a holiday adjusted calendar and comprises aligning holiday sales peaks year over year. According to this aspect of the retail planning process, alignment of major and minor holiday peaks and key retailer annual events is critical to correctly find the correct power spectrum of product sales time series.

Referring back to FIG. 5, the next step in the retail system planning process 500 comprises calculating features as indicated by reference 520. According to an embodiment, the process comprises functions for calculating cannibalization, cadence, affinities, baselines, power spectra and/or standard analytic files for actionable features and non-actionable features.

Figure 16:
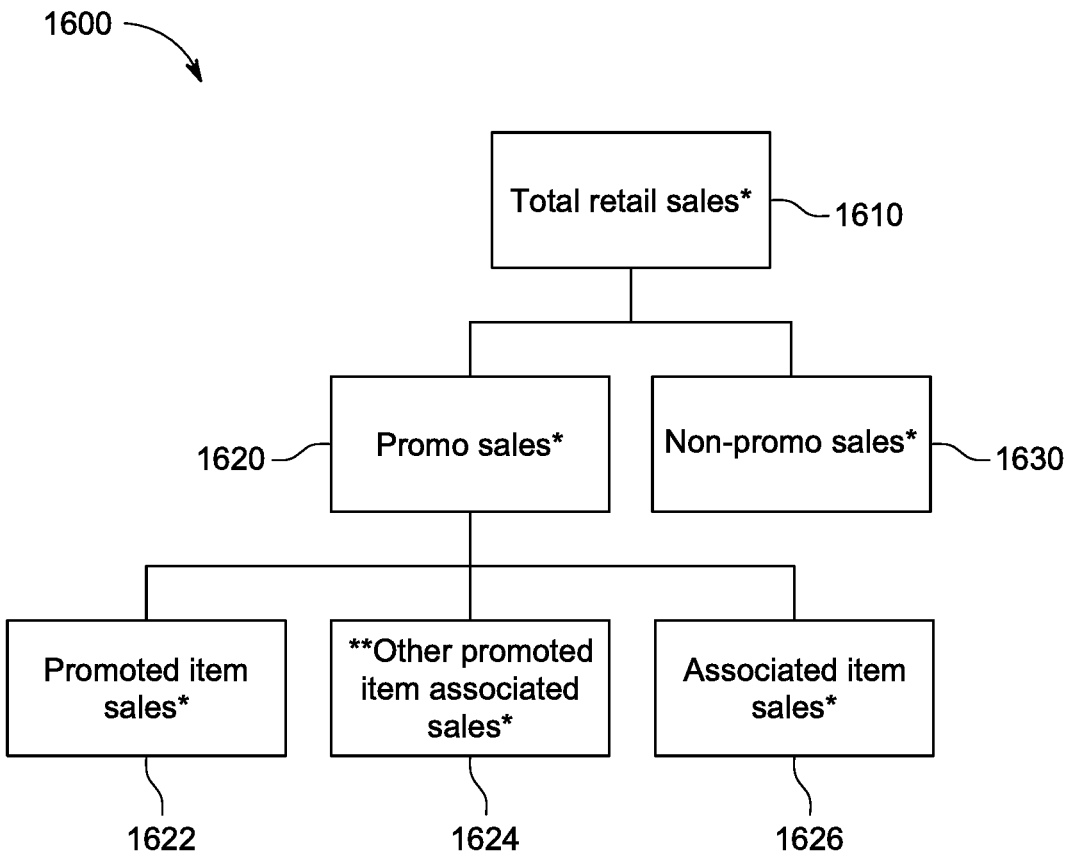
FIG. 16 shows in diagrammatic form segmentation and definition of retail sales.

According to this aspect, retail total sales are sub-divided into transactions that contain at least one promoted item and into transactions that contain only non-promoted items. With one item providing the context, other items in the same transaction are associated or halo items. According to a further aspect, the associated items are split into non-promoted associated and other promoted items. The objective is to grow overall sales by weekly promotion sales promoted in flyers or other promotional vehicles. This functionality is further illustrated with reference to FIG. 16 which shows in diagrammatic form, segmentation and definition of retail sales, indicated generally by reference 1600. As shown in FIG. 16, Total Retail Sales 1610 comprises Promo Sales 1620 and Non-Promo Sales 1630. Promo Sales 1620 are further divided into Promoted Item Sales 1622, Other Promoted Item Associate Sales 1624 and Associated Item Sales 1626. The promoted item 1622 comprises an item that was part of the promotion. The other promoted item 1624 comprises other promoted items in the same transaction as the promoted item 1622. The associated item 1626 comprises a non-promoted item in the same transaction as at least one of the promoted items. In this context, FIG. 17 shows a transaction receipt indicated by reference 1700 with specific examples of the sales segmentation according to FIG. 16. A promo-transaction comprises a transaction that includes at least one promo item. The total sales segmentation is achieved by aggregating all receipts across all stores.

According to this aspect, to maximize total retail sales, promoted sales are maximized while maintaining non-promoted sales. This can be achieved by promoting items which drive a large number of associated items. To identify which items drive the purchase of associated items, the retail system planning process includes a function for association rule mining. According to an exemplary implementation, the association rule mining function is based on the aprioriTID algorithm, which is depicted in FIGS. 18A to 18C, and indicated generally by references 1800, 1830 and 1850, respectively. The particular implementation details for the aprioriTID algorithm will be readily within the understanding of those skilled in the art.

The output of association rule mining comprises a N×N matrix, for example, as depicted in FIG. 19 and indicated generally by reference 1900. The N×N matrix represents the affinity, and each entry is an itemset that provides a measure of halo sales or halo transaction effect, for instance, when multiplying a single category by a column of the matrix. In the context of a sales and profit optimization, each entry in the matrix is a confidence measure from apriorTIDi. The diagonal elements are equal to 1 and the sub- and super diagonal elements are the confidence for rule with item set n as the rule body and item m as the rule head. In the N×N matrix 1900 shown in FIG. 19, each element $a_{ij}$ is a floating point value representing either the support, lift or confidence for the relationship between item sets i and j. For sales optimization $a_{ij}$ confidence is utilized as the affinity measure and for transaction optimization support is utilized. Association rule mining can be executed at any level in a retail product hierarchy. According to another aspect, cannibalization, i.e. implicit cannibalization, can be represented by support, lift and confidence that is built into the affinity matrix.

Figure 20:
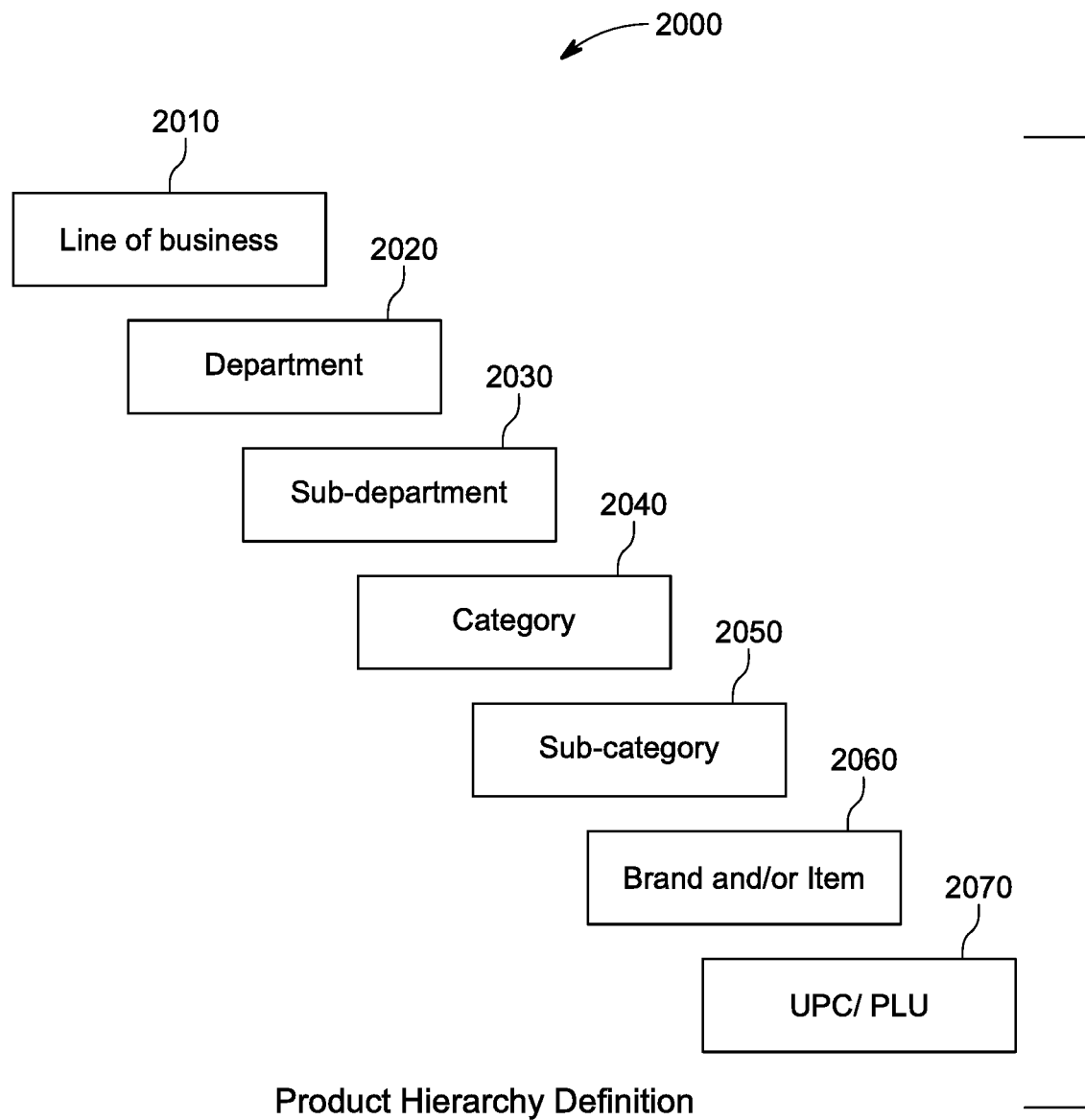
FIG. 20 shows a product hierarchy structure.

According to an embodiment, a product hierarchy structure is provided as depicted and indicated by reference 2000 in FIG. 20. The product hierarchy 2000 is defined based on a Line of Business 2010 and comprises a top-down hierarchy from Department 2020, Sub-Department 2030, Category 2040, Sub-Category 2050, and Brand and/or Item 2060 to UPC/PLU 2070, as shown in FIG. 20. The UPC is a number code (Universal Product Code) that is used in barcodes on a product to permit scanning by a point of sale device. There are several international standard UPC formats. The PLU (Price Look Up) is a typically 4 or 5-digit number for non-barcoded products that a cashier can manually type into a point of sale device to look up its price.

Figure 21:
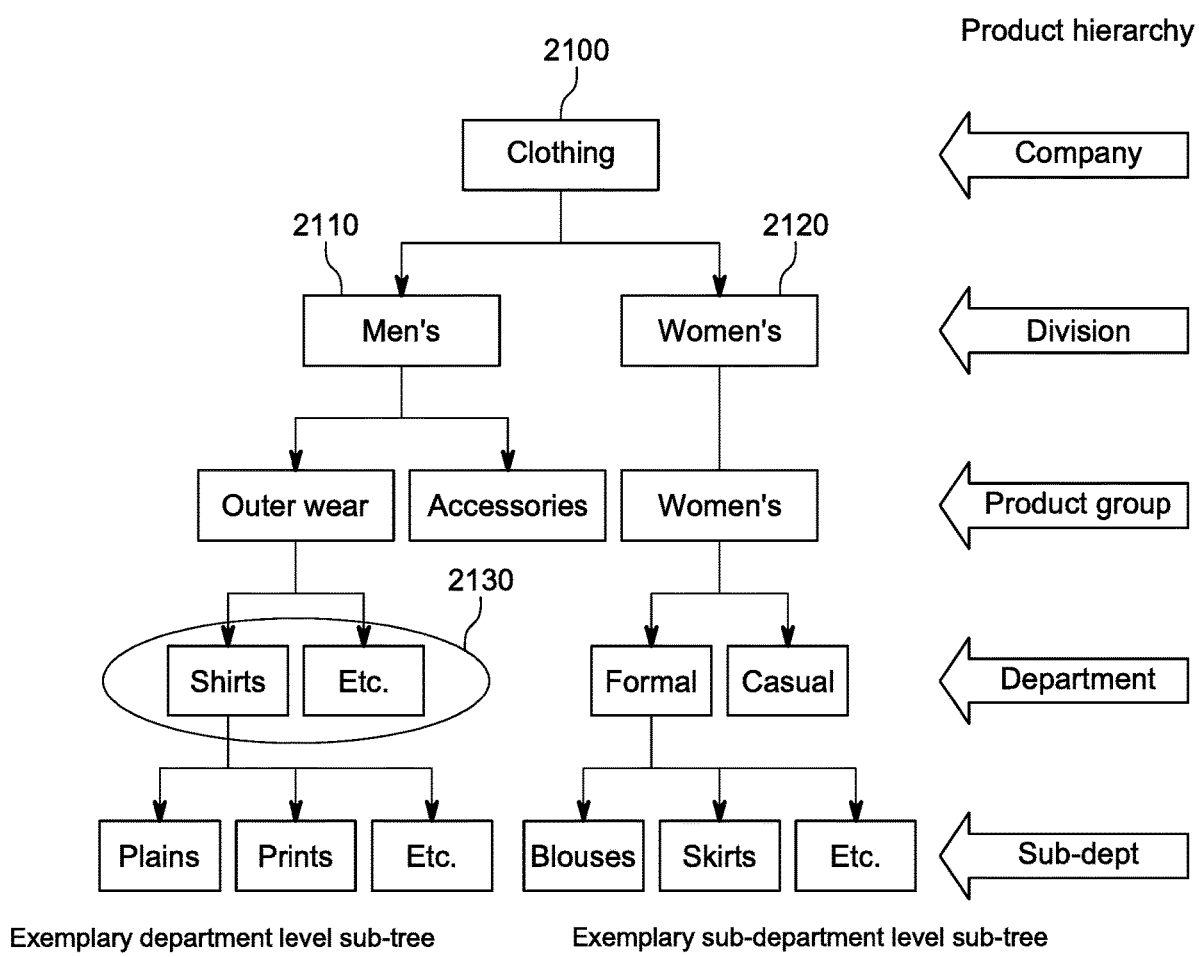
FIG. 21 shows an exemplary product hierarchy structure for clothing.

FIG. 21 shows an exemplary product hierarchy for clothing indicated generally by reference 2100 and comprising a Men's clothing line 2110 and a Women's clothing line 2120. It will be appreciated that the product hierarchy and number of levels (i.e. granularity) is based on the particular product and industry. For example, "outerwear" comprises "shirts" as indicated by reference 2130 in FIG. 21.

Cannibalization occurs when a product on promotion affects the sales of other first or second degree related products during the same promotion period. The retail system planning process includes functions to deal with cannibalization. To achieve maximum promoted item sales, the cannibalization of non-promoted item sales needs to be minimized.

According to one aspect, cannibalization is determined for a given period of time at a level in the product hierarchy (i.e. category) by determining a baseline for each element at one hierarchy level below (i.e. sub-category), as follows and described in more detail below:

- for each category, aggregating the delta between the actual sales for that given week of each element and the associated baseline
- repeating this process for each specific category
- repeating the process at the next highest level, and subtracting the cannibalization accounted for at the lower level According to another aspect, cannibalization is determined across a time period for a given level in the hierarchy (i.e. sub-category) by determining a baseline for each sub-category, and then measuring the delta between the actual sales and the baseline sales for the sub-category and the other sub-categories for each future week up to a cadence duration for each sub-category pair, as described in more detail below.

Figure 22:
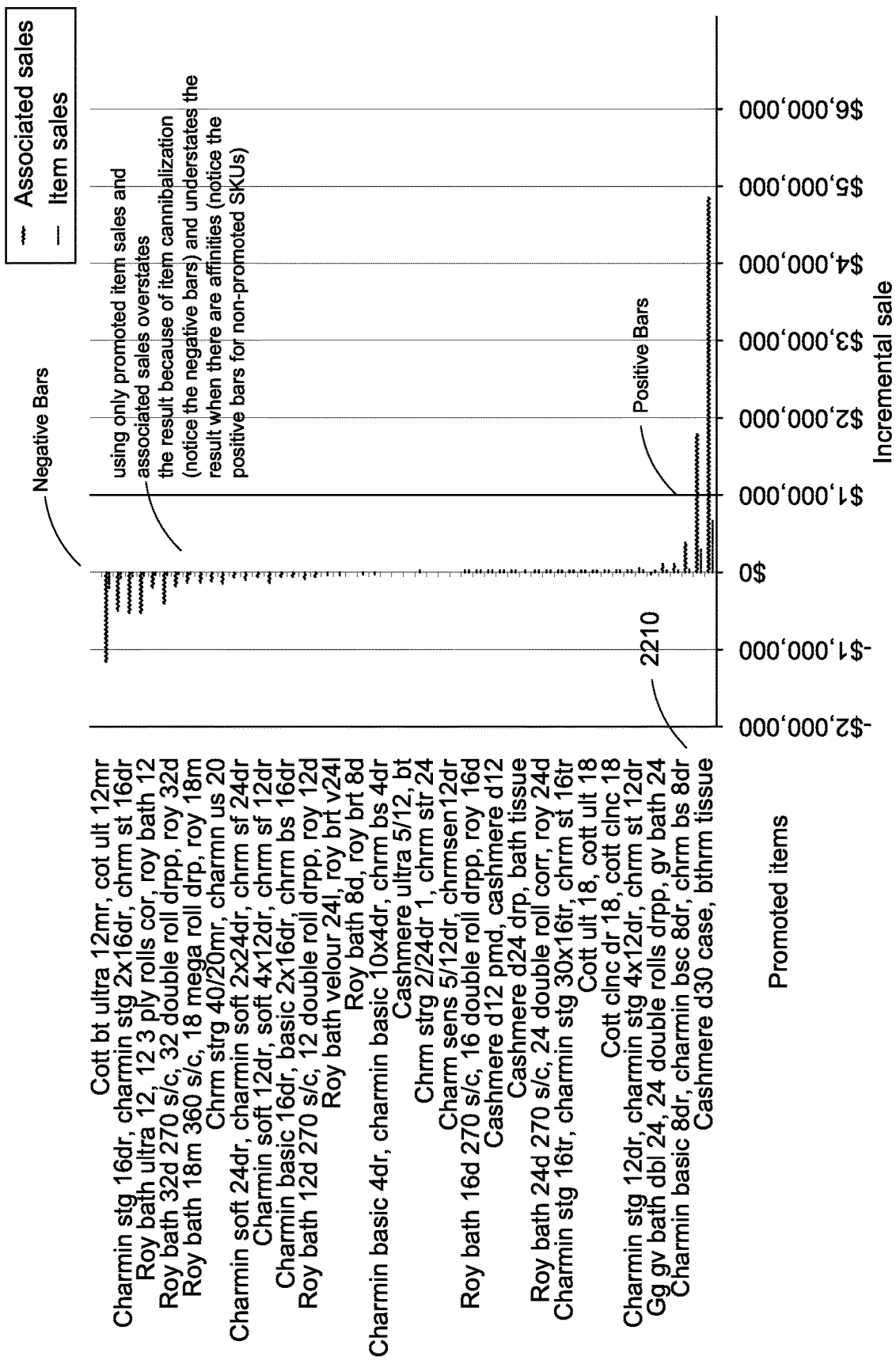
FIG. 22 shows cannibalization in a given time period for a product within a sub-tree of a product hierarchy.

With reference to FIG. 19, it will be appreciated that cannibalization between itemsets is implicit in the affinity matrix 1900 when utilizing the lift measure. In particular, itemsets with a lift of less than 1.0, cannibalize each other, and itemsets with a lift of greater than 1.0 support each other. Cannibalization in a given time period is measured using the retail hierarchy. For example, FIG. 22 shows how promoted items 2210 have incremental sales and associated sales above their normal non-promoted sales amount. Other products in the same sub-tree, for example, the Department Level Sub-Tree for Outerwear 2130 in FIG. 21 can be cannibalized (i.e. have a negative incremental sales result compared to their normal sales) or can be supported and also have positive incremental sales even though non-promoted if that item has a positive affinity with the promoted item in the same sub-tree.

According to an embodiment, the cannibalization relationship between itemsets is determined by performing aggregation at all sub-trees in the product hierarchy and correlation between the promoted and non-promoted items in each sub-tree. The cannibalization is expressed as a matrix as shown in FIG. 23 and denoted by reference 2300. In the matrix 2300, each entry represents the cannibalization of the sub-tree element m versus element p as a fraction between 0 and 1, and indicating the fraction of the sales p that is cannibalized when product m is purchased.

Figure 24:
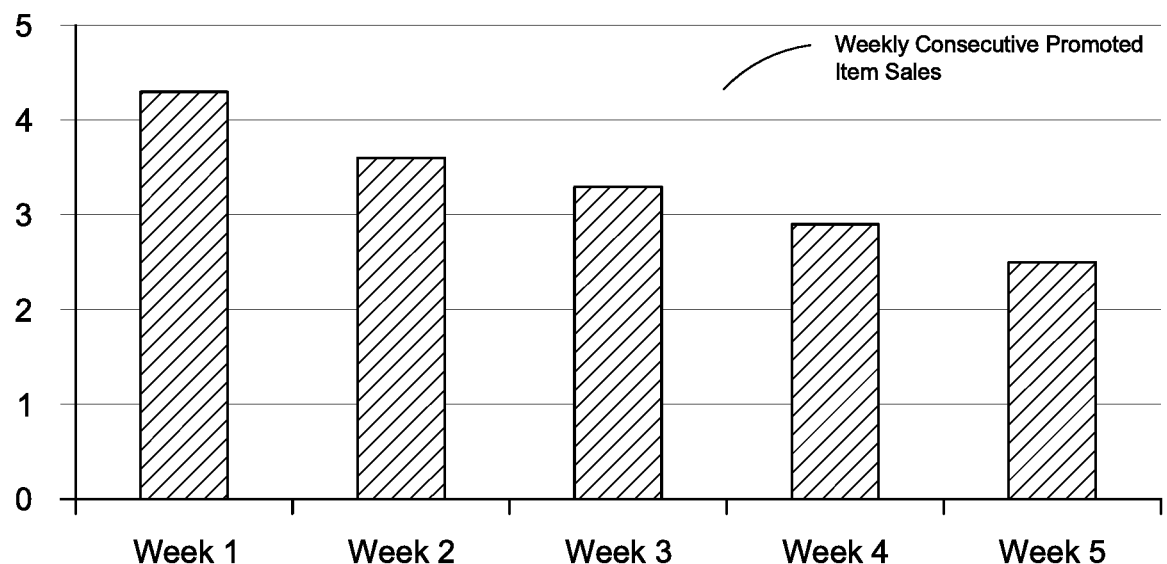
FIG. 24 shows product cannibalization over time resulting from over promotion.

Reference is next made to FIG. 24, which depicts product sales cannibalization over time indicated generally by reference 2400, which occurs due to consumers purchasing products intended to be used over a period of time. For instance, promotions typically increase "consumer forward buying behavior" as they stock up on products at a favourably perceived price. Each promoted product can cannibalize its own future sales. Sales of associated products can also be affected. It will be appreciated that these types of promotions are inefficient and result in "lost sales".

Figure 25:
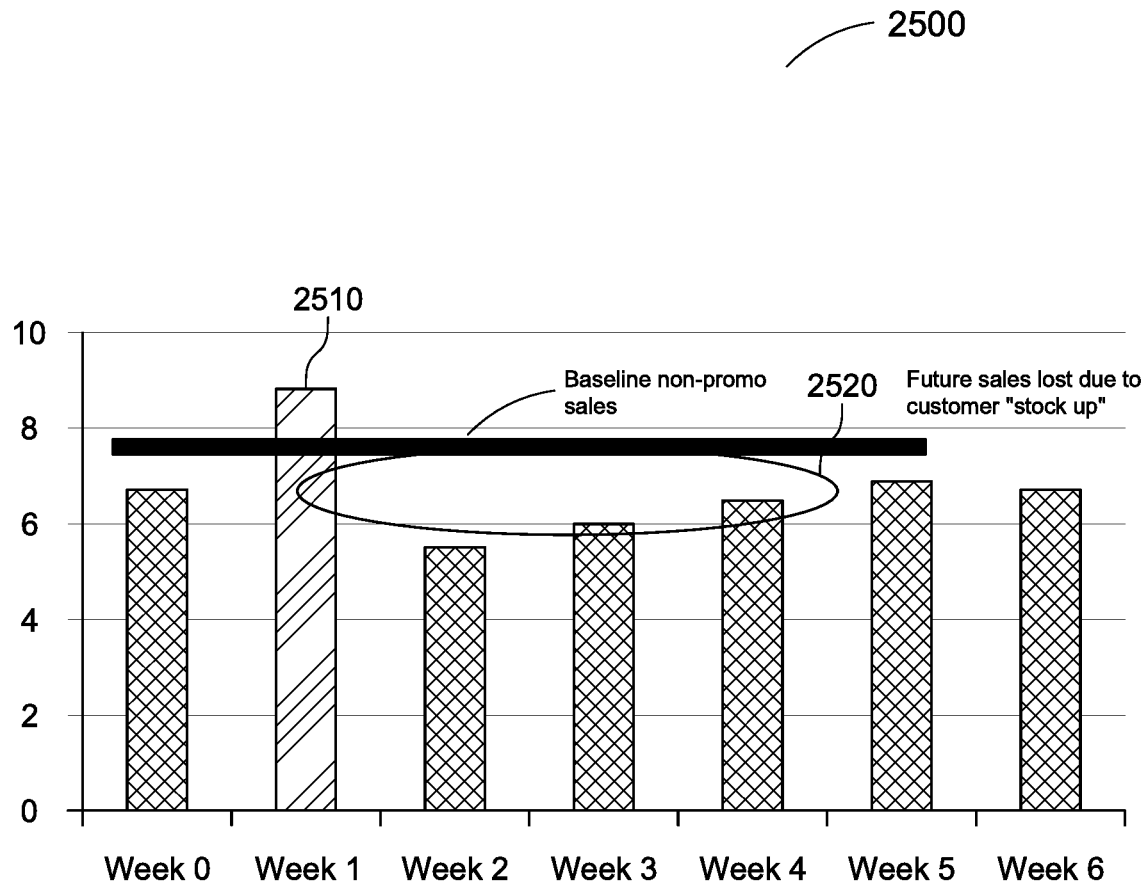
FIG. 25 shows another example of product cannibalization over time.

Cannibalization over time can also occur between products in product hierarchy sub-trees as shown in FIG. 25 and indicated generally by reference 2500. Promotion of non-perishable items indicated by reference 2510 "steal" from future sales of other products indicated by reference 2520, and the promoted product can be different from the product being cannibalized. Future sales are lost due to customers "stocking up". It will be appreciated that a non-perishable item will have a natural cadence defined as the number of weeks required for sales to return to a "baseline" level following the promotion.

Figure 26:
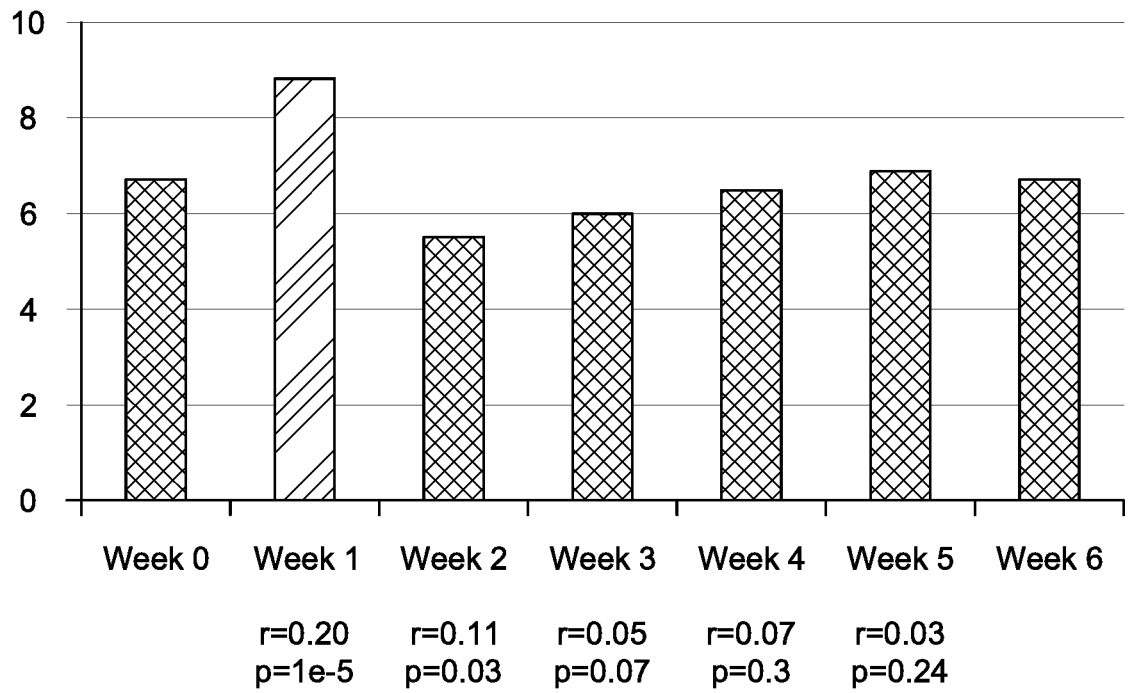
FIG. 26 shows in diagrammatic form methods for determining a cannibalization period or cadence according to an embodiment of the present invention.
Figure 27:
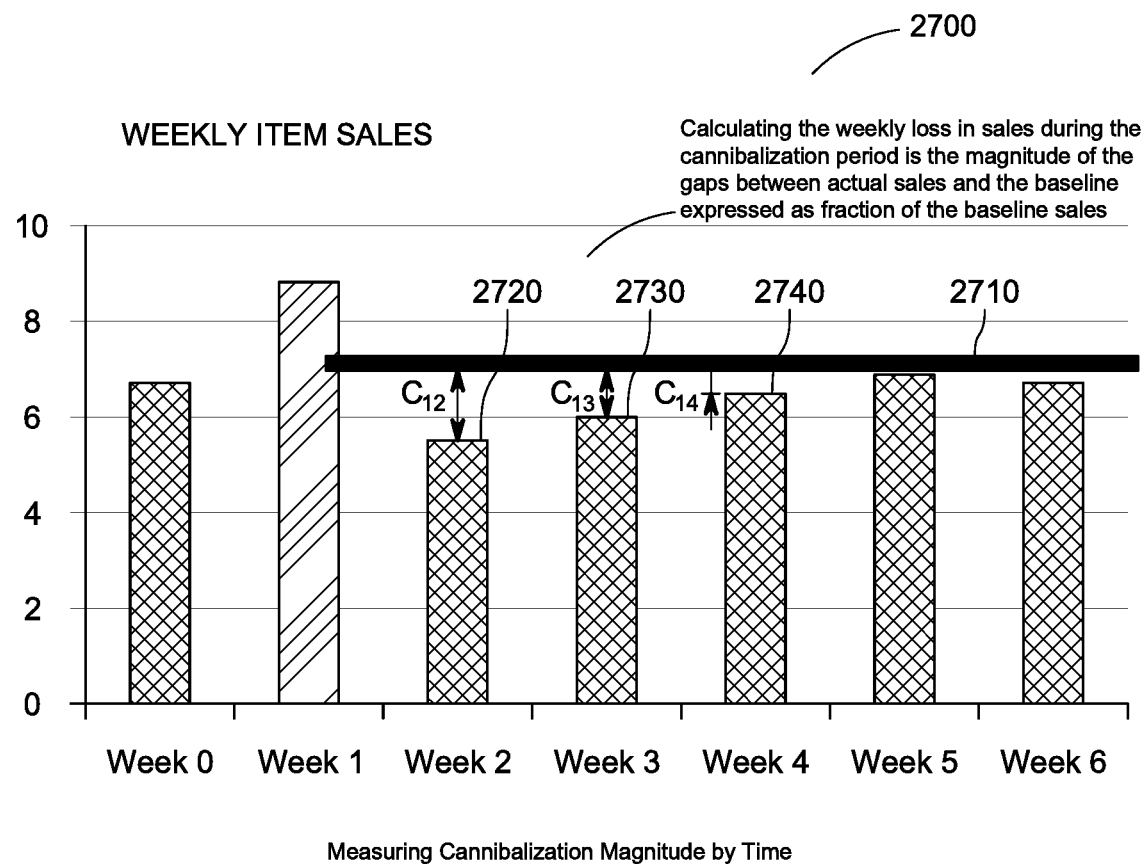
FIG. 27 shows in diagrammatic form a method for determining cannibalization magnitude by time according to an embodiment of the present invention.

According to another aspect, cannibalization that occurs across time is defined by two measures: (1) duration or cadence; and magnitude. The duration or cadence is defined as the length of the time that cannibalization occurs. It is typically measured in days or weeks, for example, as depicted in FIG. 26 and indicated generally by reference 2600. The magnitude of the cannibalization as a function of time is illustrated in FIG. 27. As shown in FIG. 26, the weeks of sales after a promotion are correlated to the promotion week of sales to determine if there is a sales impact, e.g. cannibalization. The cannibalization period is determined using two methods. The first method comprises determining once there is no statistical correlation indicated by the p-value of the Pearson correlation coefficient. The second method comprises utilizing the decay constant to fit the Pearson correlation coefficients with an exponential decay. For example and as illustrated in FIG. 26, a cannibalization period between 3 and 4 is determined when the P-value falls below 90% significance threshold (the first method), or when the decay constant of $\lambda=1.0$. Referring to FIG. 27, the cannibalization magnitude is the magnitude of the gap between actual sales, for example, indicated by references C12, C13, C14 and 2720, 2730, 2740, and a baseline for non-promotional sales indicated by reference 2710.

Reference is next made to FIG. 28, which shows cannibalization matrix for representing cannibalization over time according to an embodiment of the invention and indicated generally by reference 2800. The cannibalization matrix 2800 comprises a four-dimensional matrix $C_{ijmp}$ for determining cannibalization between product i versus product j when product i is promoted on week m and product j is promoted on week n. Each product cannibalization ij has an N×N matrix (i.e. represented by m and p), where N is the number of periods allowed for measuring cannibalization. According to an exemplary implementation, the cadence value for each product combination ij must be less than or equal to 2N.

Reference is next made to FIG. 29, which shows a data set for determining cannibalization cadence and magnitude according to an embodiment of the present invention and indicated by reference 2900. Each record 2910 (indicated individually by references 2910a, 2910b . . . 2910z) in the data set 2900 represents a week, or other period, that the product in question was promoted and the following weeks or period (of equal magnitude) immediately following the promoted period. The first column indicated by reference 2922 in the data set 2900 represents a promoted period for sales, and subsequent columns 2924a, 2924b . . . 2924y represent the sales for the subsequent periods for the product in question if calculating self-cannibalization over time, or for a different product, if calculating cross-product cannibalization. As depicted in FIG. 29, P generally represents the period Sales, Margin, Margin % or Transactions. The parameter Z represents the number of times that a product has been promoted over a period time, i.e. product history. If Product J is used for periods 1 to Y, then cross-cannibalization is determined. If Product i is used for periods 1 to Y, then product cannibalization is determined. According to another aspect, cannibalization can be calculated at any level in the product hierarchy.

The cadence of the cannibalization is determined by correlating the subsequent columns 2924 against the promoted column 2922 to calculate a Pearson correlation coefficient and its p-value for each time period. If the subsequent period is affected (cannibalized) by the product promotion there will be a correlation. Once the correlation vanishes, the cannibalization is no longer occurring. The difference in time expressed as a number of periods is the difference between the period where the correlation vanishes and the promotion period. One method for determining when the correlation vanishes is by looking when the p-value shows an insignificant correlation at some confidence level. A second method comprises fitting an exponential decay curve ($e^{-\lambda t}$) to the correlation values and using the decay constant which best fits correlation values where t represents the number of time periods since the promotion. It will be appreciated that for some products it is not possible to calculate cannibalization because (a) the product has not been promoted enough to get a statistically significant measurement; (b) the product is promoted too frequently; or (c) the product does not have any cannibalization effect. For these products, a rule is typically implemented by the retailer with default cannibalization period and a default magnitude, i.e. the matrix 2800 in FIG. 28. Cannibalization can be calculated at any level in the product hierarchy.

Reference is made back to FIG. 5. Following the determination of required features 520, for example, cannibalization as described above, the next step comprises a process for feature detection to identify relevant features as indicated by reference 522 as shown in FIG. 5. The process comprises selecting relevant actionable features and non-actionable features from a standard analytic file.

According to an embodiment, the feature detection comprises a process for reducing features to those features that are relevant for the current period being processed. According to an embodiment, the feature detection process comprises linear correlation on the features versus the metric being optimized (e.g. sales, gross margin, transactions) and choosing the most linearly correlated features followed by removal of all redundant features that are correlated to each other. According to another embodiment, principal components analysis is performed to form a linear basis of the dimensionality of the number of features followed by correlation of the components versus the metric being optimized. According to another embodiment, LASSO Regularized regression is used to select relevant features that are most predictive of the metric being optimized. According to another embodiment, training a Deep Neural Network Auto Encoder so that the input feature layer matches an identical output layer, the innermost layer of the network representing a non-linear reduced feature set to be correlated to the metric being optimized.

The next step in the retail system planning process 500 comprises generating a system model for the retailer, as indicated by reference 530 in FIG. 5. According to one aspect, an output retail plan is generated in electronic form for a retailer as described in more detail below. According to an embodiment of the invention, the retail system planning process is configured with a plurality of processes or functional components to execute the processing and calculating operations in order to determine sales, gross margins, transactions and other retail metric derivable from transaction data, as described in more detail below.

According to an embodiment, the process comprises the execution of Equation (1) by a computer or computers operating under stored program control in order to generate a retailer state model. As will be described in more detail below, Equation (1) comprises a mathematical-based formulation or function which is executed under stored program control to model a retail environment and simulate retail metrics, for instance, year-over-year sales, margins and/or transactions as a function of year-over-year promotional difference, i.e. associated sales impact minus cannibalization impact. According to another aspect, several years of detailed historical data can be leveraged to eliminate specific external effects on a balance of averages over the years.

According to an embodiment, Equation (1) takes the following form:

$$\hat{s}(t) = \sum_{i=1}^{N}\left[\sum_{mo=1}^{n_m}\left\{\sum_{ps=1}^{n_{ps}}\left(\sum_{p=1}^{n} f_p(a(t_{ps}), b(x, t_{ps})) + \right.\right.\right.$$

$$\left.\left.\left.\left[\sum_{j=1}^{m}\left\{(x(t)_j - x'(t_{ps})_j)y_j(t_{ps})P_j(t_{ps})\sum_{k=1}^{m}\beta_{c(j)}(A_{jk}(t_{ps}) - B_{jk}(t_{ps}))R_{d(k)}\right\} + \right.\right.\right.\right.$$

$$\left.\left.\left.V_j\right)\right\}_{ps}\right\}_{mo}\right]$$

where

ŝ=total sales, gross margin or transactions for the period in question (i.e. time t) All feature values and theory components are for time $t_{ps}$ the relevant power spectrum peaks.

N=number of weeks for the historical data used for the calibration $n_{ps}$=number of power spectrum peaks used $n_m$=number of sub-segments (i.e. geographic region, price zone, store cluster, store type, customer segment)

n=number of terms in the predictive model (i.e. number of coefficients)

m=the number of elements of the product hierarchy level used in the equation $x_j$=the number of products being promoted in the week in question where the product can be represented by any level in the product hierarchy whose elements are identified by index j. This is an integer.

$x'_j$=the number of products promoted in a prior period of interest for hierarchy level value j. This is an integer.

$f_p(a,b(x_p))$=linear or non-linear model with features calculated at prior periods of interest, with a=non-actionable features (these variables don't depend on the solution vector x)

b(x)=actionable features (depend on the solution vector x)

In linear form, $$f_p(a,b(x))=C_0+C_1a_1+C_2a_2+\ldots+C_ra_r+C_{r+1}b_1+C_{r+2}b_2\ldots+C_nb_{n-1-j};\text{ where }p=(1n)$$

Figure 30:
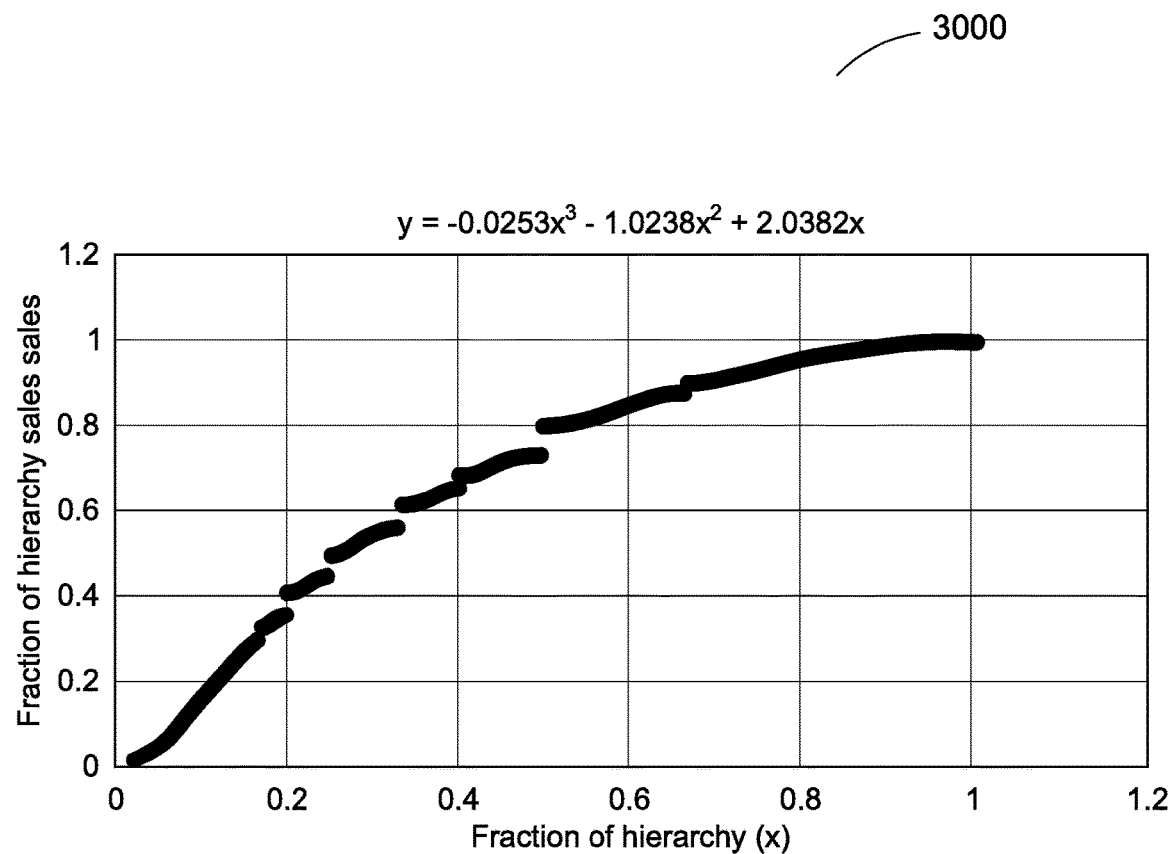
FIG. 30 shows a scaling curve for increasing number of products promoted within a hierarchy sub-tree.

$C_p$=coefficients (that will be calibrated)

r=number of non-actionable features in the model n-r=number of actionable features in the model P=Average sales, margin or transactions per week $y_j$ is a fraction of the total average sales, margin or transactions per week representing the fact the increasing the number of products promoted within a hierarchy sub-tree does not scale linearly and it cannot scale beyond the maximum number of products available. Based on actual data unique to each product hierarchy sub-tree, it is possible to fit a polynomial curve or other diminishing curve to the actual data, for example, as shown in FIG. 30 and indicated generally by reference 3000.

$A_{jk}$=affinity matrix showing affinity between itemset j with itemset k. Item could be any level in the product hierarchy. For sales or margin optimization, affinity elements are confidence, for transaction optimization the elements are support.

$B_{jk}$=cannibalization matrix showing cannibalization between itemset j with itemset k. Item could be any level in the product hierarchy. For sales or margin optimization, cannibalization elements are scaled to affinity confidence, for transaction optimization the elements are scaled to affinity support.

$R_{d(k)}$=resultant binary of item k . . . the coefficient is a function of k, the number of coefficients is less than or equal to k $$R_k = \begin{cases} 0 & \text{if }(x_k - x'_k) = 0 \\ 0 < c < 1 & \text{otherwise} \end{cases}$$

the constant c to be calibrated $\beta_{c(j)}$=unknown model coefficient to be calibrated . . . the coefficient is a function of j, the number of coefficients is less than or equal to k $V_j$=any marketing funding provided to the retailer in exchange for including the product j in the promotion for a specific period or periods.

The next step in the retail system planning process 500 comprises executing a process to define/use optimal control policy (e.g. merchandise promotion planning) to simulate optimal decision options for the retailer. The process comprises defining or using optimal policy derived from the retailer state model in order to simulate future occurrences and generate a sequence (e.g. long term) of category level promotion which can maximize long term reward or return for the retailer.

To search for the optimal policy, the retail system planning process 500 is configured to assemble and execute Equation (1) for all historical periods available where all features and the metric of interest are known. According to an exemplary implementation, Equation (1) is set up using weekly values of the affinity and cannibalization at the category level of the hierarchy although any period size and hierarchy level is feasible. The solution vector $x_j$ will be at a lower level of the product hierarchy (typically sub-category if category or sub-department is used for the affinity and cannibalization matrices). It will be appreciated that for determining the optimal policy, the solution vector $x_j$ or control inputs is based on known historical data. An exemplary data set is depicted in FIG. 31. According to another aspect, the summations in Equation (1) can be expanded to form a data set structure 3100 which is used for searching for the optimal control policy, as depicted in FIG. 31. With reference to FIG. 31, the data set 3100 is based on a Z periods, and the period typically comprises a promotional week, but may be selected to have a shorter or a longer duration. As shown, the data set 3100 includes an "Actual Sales or Gross Margin or Transactions" column 3110, where Yi represents the actual value of the metric of interest and taken from historical data; and a "Predicted or Gross Margin or Transactions" column 3120, where (Yi)^ represents the predicted value of the metric of interest based execution of Equation (1) with historical data. The remaining columns 3122 in the data set 3100, and indicated individually by references 3122a, 3122b . . . 3122n, comprise the resultant features generated through the execution of Equation (1), where $X_{11}$ to $X_{ZN}$ represent the features or component for Equation (1).

According to an embodiment, the known historical data is used to identify the floating point coefficients $C_p$ in the equation $f_p(a,b(x_p))$ and also the coefficients $\beta_{c(j)}$ by minimizing|s−ŝ| where s is the known value of the metric of interest from historical data and ŝ is the value of the metric of interest calculated from the above mathematical theory. It will be appreciated that the above equation is linear in the coefficients $C_p$ and $\beta_{c(j)}$ and can be determined using gradient descent. The equation and coefficient values which minimize |s−ŝ| forms the optimal control policy which can be used to choose the control input vector $x_j$ the number of products to promote in a given period for each element of the product hierarchy level in question.

Referring back to FIG. 5, the next step indicated by reference 550 in the retail system planning process 500 comprises setting up constraints and calculating solution increments in order to select promotions (e.g. weekly promotions) for achieving a long-term plan for the retailer.

The next step in the retail planning process 500 comprises using detailed control policy to simulate optimal decision options for the retailer, indicated by reference 560 in FIG. 5. According to one aspect, this involves utilizing the optimal policy to generate a long-term sequence of sub-category level promotions that maximizes the long-term reward or objectives of the retailer.

According to an embodiment of the invention, the retail system planning process 500 is configured to execute Equation (1) utilizing optimal policy determinations as follows in order to simulate optimal planning options for the retailer.

According to this aspect, Equation (1) is used with optimal coefficients $C_p$ and $\beta_{c(j)}$ that minimize |s−ŝ| over all history to forecast the future performance of the desired metric. The optimal sequence of actions $x_j(t)$ is the one that maximizes the reward ŝ(t) over a sequence of times t. For example, if Equation (1) is set up for the category level in the hierarchy (i.e. the affinity and cannibalization matrices are calculated at the category level) and if the control input $x_j$ is set up to be the number of products promoted at the sub-category level, then maximizing ŝ(t) for various sequential times t by varying the control input $x_j(t)$ is equivalent to finding the optimal action $x_j(t)$ at each time t. The solution vector $x_j(t)$ is typically subject to sum constraints on the total number of products to be promoted, or the total products to be promoted at some higher level in the hierarchy. The solution vector $x_j(t)$ will be also constrained by the maximum number of products available within a hierarchy level and that fact that it should be greater than equal to zero. The constraints may be expressed in Equation (2) as a series of constraints of the form:

$$\sum_{i=1}^{L} x_i(t) < C \qquad \text{Equation (2)}$$

where L is less than n (from Equation (1)) and C is an integer constant. Utilizing the sequence of solution vectors for a period of time $x_j(t_1)$ to $x_j(t_N)$ a promotion plan is generated for periods $t_1$ to $t_N$, at whatever level the Equation (1) was set up. For instance, when set up for category level with the solution vector being number of sub-categories to be promoted this creates an optimized long term plan at the category level that forms weekly promotion constraints at the sub-category level. Retailers typically plan out a quarter to a year at the category level of detail.

A data set suitable for utilizing the optimal control policy (as determined above) to define optimal control inputs is shown in FIG. 32 and indicated by reference 3200. According to an exemplary implementation, the optimal control policy data set 3200 is defined for "N" periods of optimal actions to plans as indicated by reference 3201. A period is typically a promotional week, but have a longer or a shorter duration. As shown, the data set comprises "Actual Sales or Gross Margin or Transaction" 3210, "Predicted Sales or Gross Margin or Transactions using Equation (1)" 3220, "Feature #1 Component of the Mathematical Theory" 3222a, "Feature #2 Component of the Mathematical Theory" 3222b to "Feature #M Component of the Mathematical Theory" 3222m, and a column "Solution Vector Component 1 to m" 3230 comprising a solution vector for each period. For the data set 3200, Yi^ represents the predicted value of the metric of interest using historical data and Equation (1), $X_{11}$ to $X_{ZN}$ represent the features or component for Equation (1), and $x_j(t)$; j=1 . . . m are the control inputs to be optimized in Equation (1).

According to an embodiment, to solve Equation (1) with constraints of Equation (2) and the data set 3200, the retail system planning process 500 is configured to execute a genetic algorithm or particle swarm optimization in order to simulate the future and choose an optimal control strategy. It will be appreciated that genetic algorithms are a form of reinforcement learning that introduces a combined element of exploitation (using long term and short term known history) and search (using a random searching capability to learn new actions not taken in the past).

To translate the category level plan into a specific list of sub-categories or brands or brand/items or items for a particular period or periods of interest, the solution vector for Equation (1) comprises the weekly constraints for more detailed planning. The detailed planning equation takes into account promotion placement, cannibalization between products at a lower hierarchy level and optimal reward search over a period of time. The detailed setup can be done between any two levels of the product hierarchy as long as the second hierarchy level is below the first. In addition to using the solution vector as constraints, the optimal solution partial derivatives are calculated to assess the impact of each incremental change to the solution vector. FIG. 33 shows in diagrammatic form a function or process 3300 based on partial differentiation for determining the incremental value $\Delta_{ij}$ of adding or subtracting more promotional items. According to an exemplary embodiment, the solution change resulting from a change to the number of sub-categories in any one category is determined. The partial derivatives are calculated for every category for a "+1" and "−1" change in number of sub-categories. This increment is calculated from the output of the category level equation and fed into the sub-category equation. The category level increments are then decomposed to the sub-category level based on the fraction of sales each line contributes to the category.

According to an embodiment, the process is configured to execute Equation (3) as follows:

$$\pi = \sum_{i=1}^{L} \left[ \sum_{j=1}^{N} \sum_{k=1}^{m(r)} (x_{ij}\Delta_{ij}(1+y_{ij}\sigma_i)) - \sum_{k=1}^{m(r)} \left\{ \sum_{l=1}^{P} \sum_{l'=1}^{P} \Delta_{il}(1+y_{il}\sigma_i)x_{il}C_{ll'}^{ik}, x_{il'} \right\} \right]$$

where, $x_{ij} \in \mathbb{I}$ in interval [0,1]; is the solution vector to be solved for indicating whether or not a product i is to be promoted on period j.

$y_{ij} \in \mathbb{I}$ in interval [0,1] and indicates preferential promotional placement with 0 indicating no preference and 1 being the most advantageous.

$\pi=$ is the metric of interest being optimized (sales, gross margin or transactions)

$\sigma \in \mathbb{R} > 0$ $k \in \mathbb{I}$ which takes into account the duration of cannibalization between products being considered.

r is the category identifier m(r)=number of finelines in category r

P and N is the number of promo weeks considered

L is the number of categories $\Delta_{ij}$, $\sigma_i$ and $C_{ll}^{ik}$, are all given and are the fineline increment, promotional elasticity, and cannibalization penalty respectively. All these terms are functions of time. The elements of $C_{ll}^{ik}$, are fractions between [0,1] indicating the fraction of future sales cannibalized between product i and k.

Equation 3 is subject to the following constraints according to Equation (4)

$$\sum\nolimits_{k=m}^{n} x_{ij} \leq \alpha \text{ for } j \in \{1, \ldots, N\}; \sum\nolimits_{k=d}^{l} y_{ij} \leq \beta \text{ for } j \in \{1, \ldots, N\}$$

where, m,n and d,l are subranges of the vectors from 1 to N. The constraints are the solution to the Equation 1.

It will be appreciated that Equation (3) is subject to constraints of Equation (4) (which are solutions from Equation (1)) for control inputs $x_j(t_1)$ to $x_j(t_N)$ at a lower level of product hierarchy is simulated using a particle swarm optimizer or genetic algorithm over the N periods to find the optimal sequence of detailed control inputs. The detailed solutions are actions that are directly actionable by a retailer.

The next step in the process comprises generating and delivering an output retail plan to the computer systems of the retailer or retailer environment, as indicated by reference 570 in FIG. 5. According to an embodiment, the output retail plan comprises an optimal multi-period decision set with a gamified reward measure.

As described above, the output retail plan is based on the execution of Equation (1) subject to the constraints of Equation (2), or based on the execution of Equation (3) subject to the constraint of Equation (4). According to an embodiment, the output retail plan is directly integrated into the retailer's computer systems, for instance, the operational computer systems configured for executing purchasing, pricing and forecasting.

It will be appreciated that the computational functions described above comprise a two-step or two-stage approach, and involves first solving for the higher level in product hierarchy (i.e. at the category level), and then utilizing the category level solution as constraints or parameters for determining the sub-category or item level solution, and taking into account promotional elasticity due to placement and cannibalization over time at the sub-category/item level. The resulting solutions taken on a periodic basis, e.g. weekly, are strongly coupled and the solutions can provide trajectories over time. The two-step approach takes into account the following considerations:

affinities will not be meaningful at a low level in the product hierarchy promotional elasticity is not meaningful at a high level in the product hierarchy forward buying is not meaningful at a high level in the product hierarchy cannibalization occurs at the level of grouped products, not at the SKU or lowest level It will be further appreciated that in a practical system, the product selection solutions (or control inputs) will rarely be 100 percent executed without alteration due product availability, competitive pricing concerns, and in some cases human intuition. Unconstrained or relaxed constraint solutions for the scenarios a) and b) above are generated which permit ranking of alternative product decisions. Based on the incremental value of each product in the solution vector including a larger set of products for alternative consideration when the optimal control input solution is modified each product decision is ranked and provide an index correlated directly to the increment value of that product to the decision set. The relative index can be used to compare the difference in expected performance of two ranked items. This ranking and relative index permit gamification of the otherwise complex output of the intelligent agent process.

Figure 7:
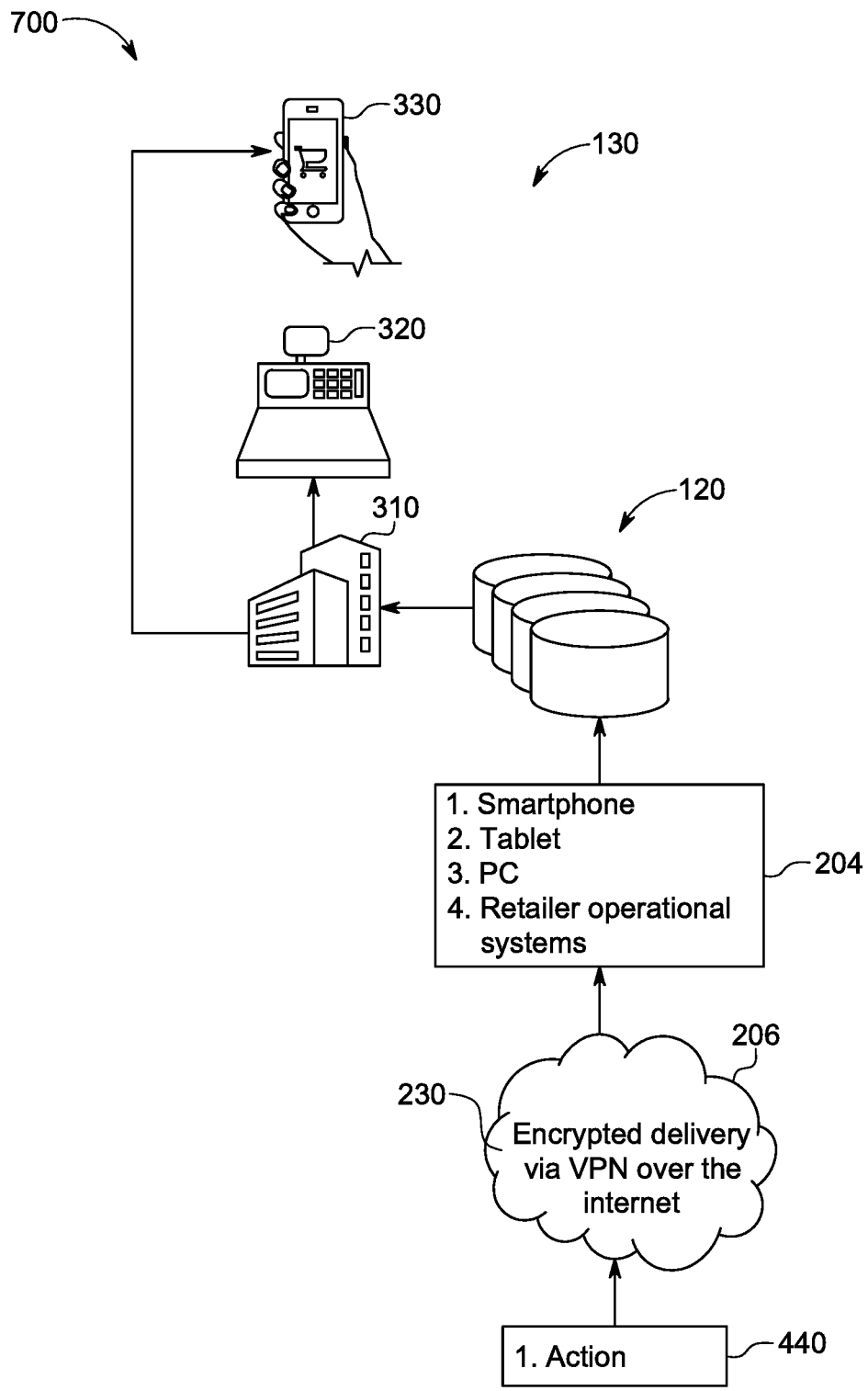
FIG. 7 shows in diagrammatic form data flow from the retail merchandise planning system to retailer entities according to an embodiment of the present invention.

The output or action plan is transmitted or outputted to the data or computer centre 310 for the retailer 130 as depicted in FIG. 7. According to another aspect, the output plan is gamified and executed on the retailer's computer system 310 as indicated by reference 580 in FIG. 5. According to this aspect, gamification of the output generated by the retail merchandise planning system 100 to a single performance measure that can be utilized by a computing system at the retailer, for example, an automated approval engine that is configured to execute decisions based on thresholding or to trade off alternative decisions using the metric to determine the better of two alternatives. Accordingly, the logic processing can be collapsed into two measures, such as a rank and an index, and partial differentiation can used to determine a gamification index, as described in more detail below.

According to an exemplary implementation as depicted in FIG. 4, a gamified output plan facilitates the evaluation of the overall impact on total rank and total relative index on the optimal decision set by changes to the product recommendations, for example, as indicated by reference 460. The retailer can compare the rank and index of multiple options with the goal to minimize rank and maximize relative index. According to another aspect, sub-games can be executed within product hierarchy sub-trees by choosing the minimum rank and maximum relative index that would be possible within the sub-tree.

The results of the execution of the output plan by the retailer computer system is captured in the client planning and transactional systems 240 (FIG. 2), as indicated by reference 590 in FIG. 5. According to another aspect, the captured data is fed back to sensory input component 410 in the intelligent agent module 400 (FIG. 4) in a feedback loop indicated by reference 592 in FIG. 5.

Figure 6:
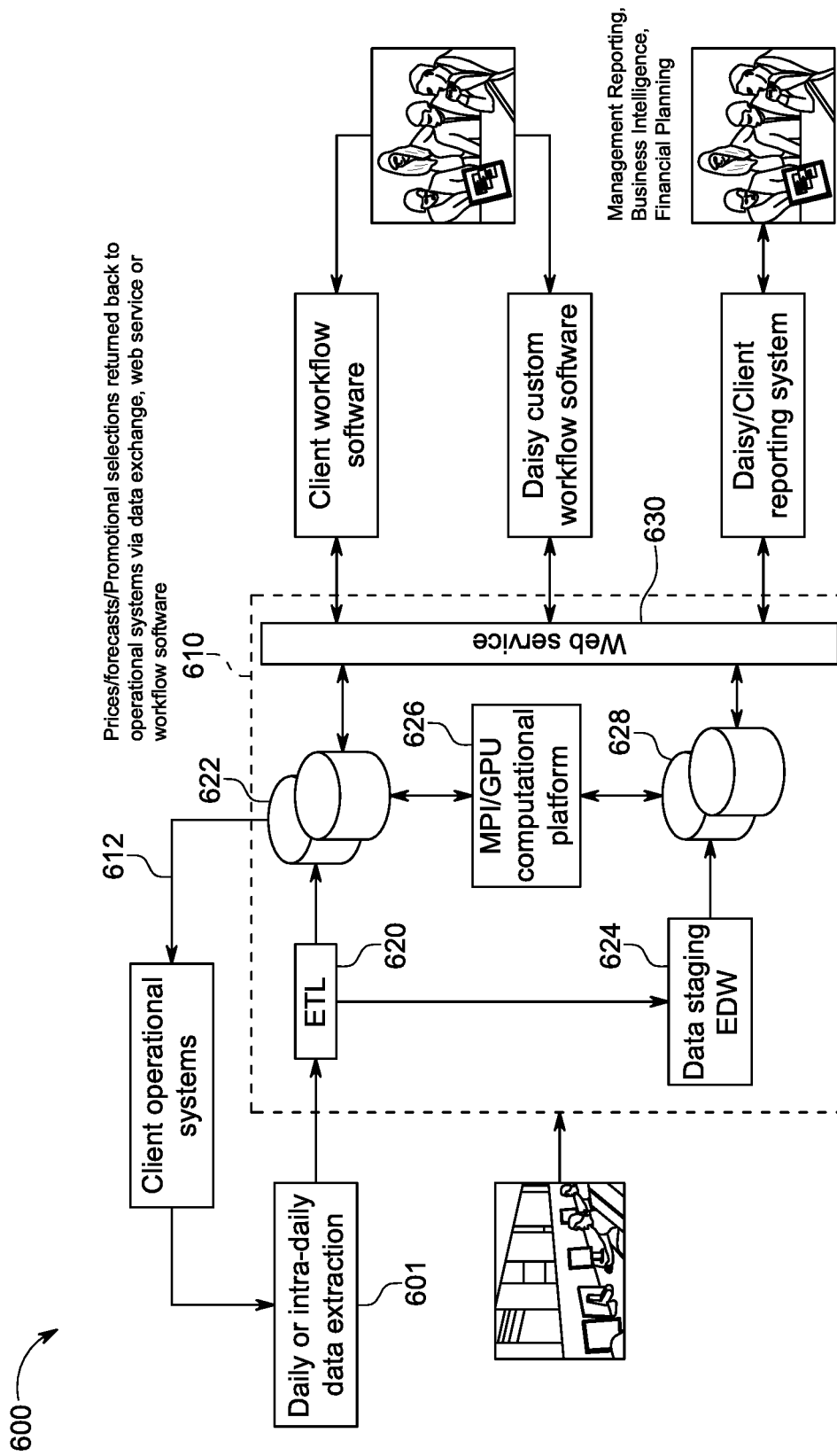
FIG. 6 shows in diagrammatic form a product selection system according to an embodiment of the present invention.

Reference is next made to FIG. 6, which shows in diagrammatic form high level data platform architecture for the retail planning system 100 of FIG. 1, according to an exemplary implementation and indicated generally by reference 600. The data platform architecture 600 comprises a data system 610 which is implemented in hardware and software in the retail planning system 100. According to an embodiment, the data system 610 comprises an ETL (Extract Transform and Load) module 620, an analytic database 622, a data staging (i.e. Enterprise Data Warehouse or EDW) module 624, a computational platform 626 and a reporting database 628. According to an exemplary embodiment, the computational platform 626 comprises a parallel computing architecture implemented in computer hardware and software and including MPI's (Message Passing Interfaces). According to another aspect, the computational platform 626 comprises one or more GPU's (Graphical Processing Units) configured to provide parallel computer processing functions. According to an embodiment, the intelligent agent module 400, as described above with reference to FIG. 4, is configured to run on the computational platform 626.

Referring to FIG. 6, the data system 610 is configured with an input interface or port, indicated by reference 640, and an output interface or port, indicated by reference 642. The input interface 640 is configured to provide an interface for receiving "retail data" from the client operational systems, i.e. the retailer computer system, for example, as described above with reference to FIG. 2. The output interface 642 is also coupled to the client operational systems of a retailer, for example, the retailer operational computer system 240 depicted in FIG. 2. The output port 640 is configured to output the retailer product plan generated by the intelligent agent module 400, and other product pricing, product forecasting or product promotional plans, as discussed above.

As shown in FIG. 6, the ETL module 620 interfaces to a data extraction module 601 in the client operational systems. The data extraction module 620 is configured to receive retail data and information from the client, for example, on a near real-time, daily or weekly basis. The ETL module 620 can be configured to provide pre-processing of the extracted retailer data, which is then routed to the data staging (Enterprise Data Warehouse) module 624. ETL data flow according to an embodiment of the invention is described in more detail below with reference to FIG. 8. The enterprise data warehouse module 624 comprises a repository for storing data from a number of sources. A data warehouse according to an embodiment of the present invention is described in more detail below with reference to FIG. 9. The data extracted from the client operational systems may also comprise feedback data and/or results (for example, as described above for the intelligent agent module 400). According to an embodiment, the ETL module 620 is configured to route this data to the analytic database 622.

According to another aspect, the data flow architecture 600 includes a web service indicated by reference 630. The web service 630 is configured to provide a web-based interface for users and/or administrators. According to an exemplary implementation, the web service 630 is configured to provide a web-based interface, i.e. utilizing a browser such Google Chrome or Safari, comprising a reporting system interface 632, an administrator workflow software interface 634 and a client workflow software interface 636. The reporting system interface 632 is configured to provide management reporting functions, business intelligence reporting functions and/or financial planning reporting functions.

Figure 8:
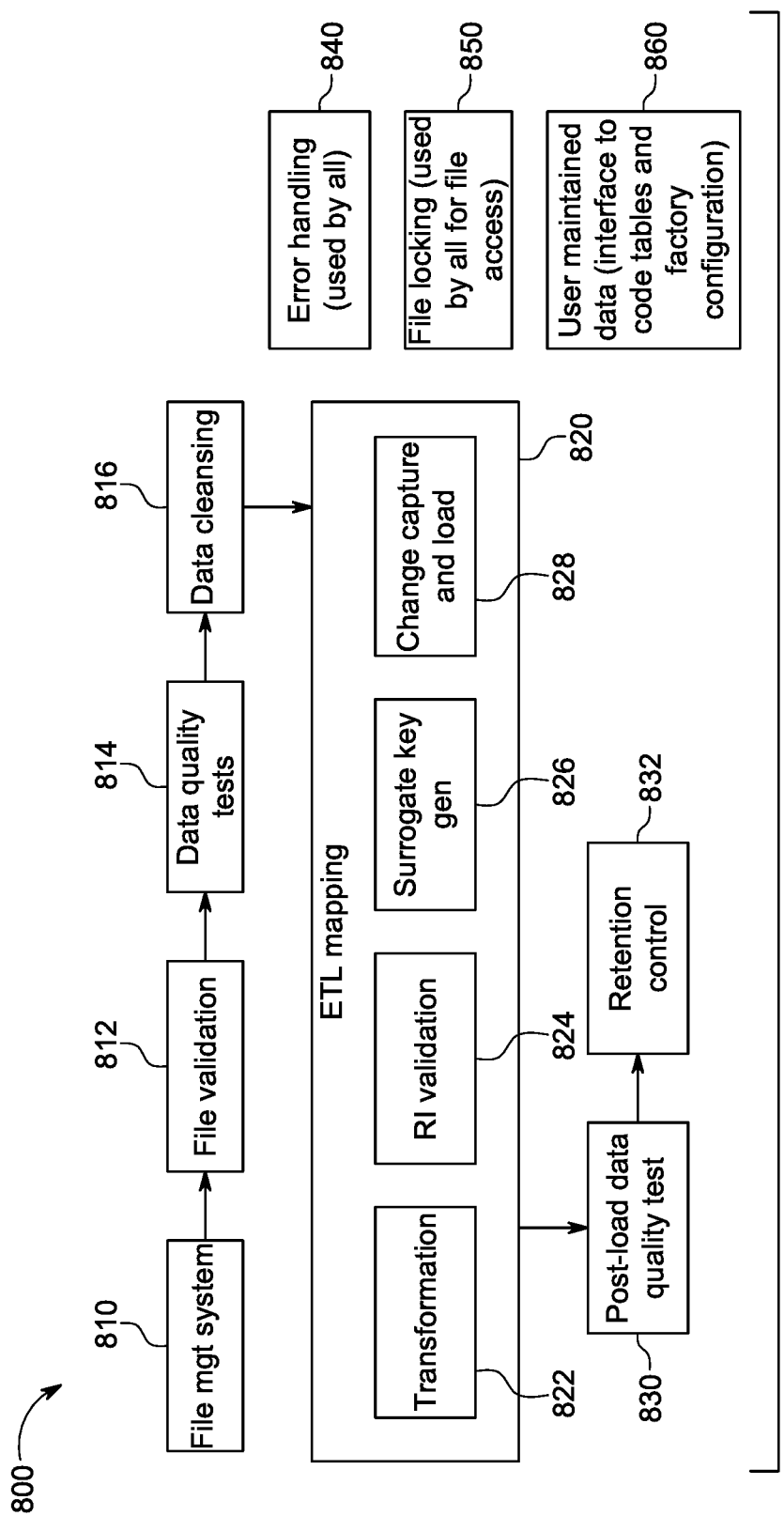
FIG. 8 shows an exemplary ETL (Extract, Transform, Load) data flow for the retail merchandise planning system according to an embodiment of the present invention.

Reference is made to FIG. 8, which a data flow process, indicated generally by reference 800, for the ETL module 620 and the date system 610 of FIG. 6. The data flow process 800 comprises a file management module or function 810, a file validation module or function 812, a data quality testing module or function 814, a data cleansing module or function 816, an ETL mapping module 820. The data flow process 800 can also include a post-load data quality testing module 830 and a retention control module 832.

The file management module 810 according to an embodiment is configured to operate under stored program control on a computer and execute the following functions:
build an expected source files list
compare files received to the expected source files list
verify that files have been received (when required)
alert operators if files are missing or received in error
log (operational metadata) when files arrive and the associated processing status
implement file acceptance logic According to an exemplary implementation, the file management module 810 (and the file validation module 812, the data quality testing module 814) is configured to expect and accept one file per day per source file type. Multiple files of the same type received from a source within a defined time frame are rejected if a file has already been accepted and received. Files received with a future date or a date more than X days in the past will be rejected. Where x is stored in the metadata (e.g. 16 days from current).

The file validation module 812 according to an embodiment is configured to operate under stored program control on a computer and execute the following validation functions:
the existence of mandatory fields and segments (e.g. headers and trailers)
internal structural file integrity checks (e.g. file record counts matching header record count value)
absence of extraneous data
comparison of file row counts to the value stored in the trailer record
data type checking by column (can be moved to DQ when implementing)
validate the specified record count against the actual received record count
validate source system code
validate the source system table
checksum if the source file has an external to firewall origination.
compare file name date and time with the extract date and time in the header record to ensure data content matches file name
compare the header and trailer records for extract date, time and system The data quality testing module 814 according to an embodiment is configured to operate under stored program control on a computer and execute the following testing functions:
perform file quality checks that identify files that are accepted for downstream ETL processing; identify files that are rejected based on thresholds stored in the Entity table of the metadata.
perform Row/Column quality checks which will identify data rows within files that are:
accepted for downstream ETL processing
rejected and will not be forwarded for downstream processing. Once a row has been identified as a rejected row, it will be:
written out to a rejected row file
logged in metadata at a summary level
identified with a warning indicator in the operational metadata logs; the warning identified data rows will remain in the data file so that downstream data cleansing will provide a pre-described response to the warning condition
the tests include,
domain Checking—for the data content of a column against a list of known values for the column. (e.g. The valid values for a product status are A—Active, I—Inactive, or T—Temporary) if any value in the isn't in the domain then an exception condition is created
range Checking that the data content of a column falls within a given range of values specified by a maximum, minimum or both The data cleansing module 812 according to an embodiment is configured to operate under stored program control on a computer and utilizing the test results from the data quality testing module 814 to execute the following functions:

perform Row Warning processing
- replace row attributes identified in the data quality testing with business supplied replacement values
- perform Data Standardization attribute updates (e.g. customer comes from more than 1 source system and both systems have a customer status code; for enterprise consistency only a single standard code will exist in the EDW
- data formatting (e.g. Date in consistent form)

produce data cleansing operational metadata
- number and type of substitutions
- number and type of data standardizations According to another aspect, this is where rejected files are re-introduced into the processing stream if they have been approved for processing by the Data Stewards.

As shown in FIG. 8, the ETL Mapping module 820 according to an exemplary embodiment comprises a transformation module or function 822, a RI validation module or function 824, a surrogate key generation module or function 826 and a change capture and load module or function 828.

The transformation module 822 according to an embodiment is configured to operate under stored program control on a computer to execute the following data transformation functions:

- application of all defined business transformation rules for the given input files
- transformation of the validated source files into load-ready files
- for each defined filter criteria, apply the condition to the validated source file, preserve the rows filtered out and log the count The surrogate key generation module 826 according to an embodiment is configured to operate under stored program control on a computer and execute the following functions:

- permanently assign a surrogate key value to an entity for each distinct natural key provided for that entity
- to enable multiple ETL processes to use the same processing logic for surrogate key generation, by using the file locking common component just as a file would be locked
- for each distinct logical entity, this process will maintain a separate cross-reference table in the EDW database that will record the relationships between natural and surrogate key values The change capture and load module 828 according to an embodiment is configured to operate under stored program control on a computer and execute the following functions:

- compare transformed input data to existing data in Slowly Changing Dimension (SCD) Type 2 target tables
- rows that are unchanged between the target table and source extract will not be modified
- insert new rows
- preserve history, the old row will be updated to set the expiry date to the extract date−1
- rows that have been deleted from source system will not be physically deleted from the EDW table. To preserve history, these rows will be updated to set the expiry date to the extract date−1

The output from the ETL mapping module 820 is then processed by the post-load data quality testing module 830 and the retention control module 832 as shown in FIG. 8.

The retention control module 832 according to an embodiment is configured to operate under stored program control on a computer to execute the following functions:

- export fact type data only from the EDW database to files that are stored in the archiving directory when data in the table has expired dates greater than the retention period specified for the table
- copy files from the archive directories to tape, confirming the copy and removing the files from the archiving directories As shown in FIG. 8, the data flow process 800 may further comprise an error handling module or function 840, a file locking module or function 850 and a user maintained database interface 860. The modules comprise functions that can be called or invoked by the other modules in the data flow process 800.

Figure 9A:
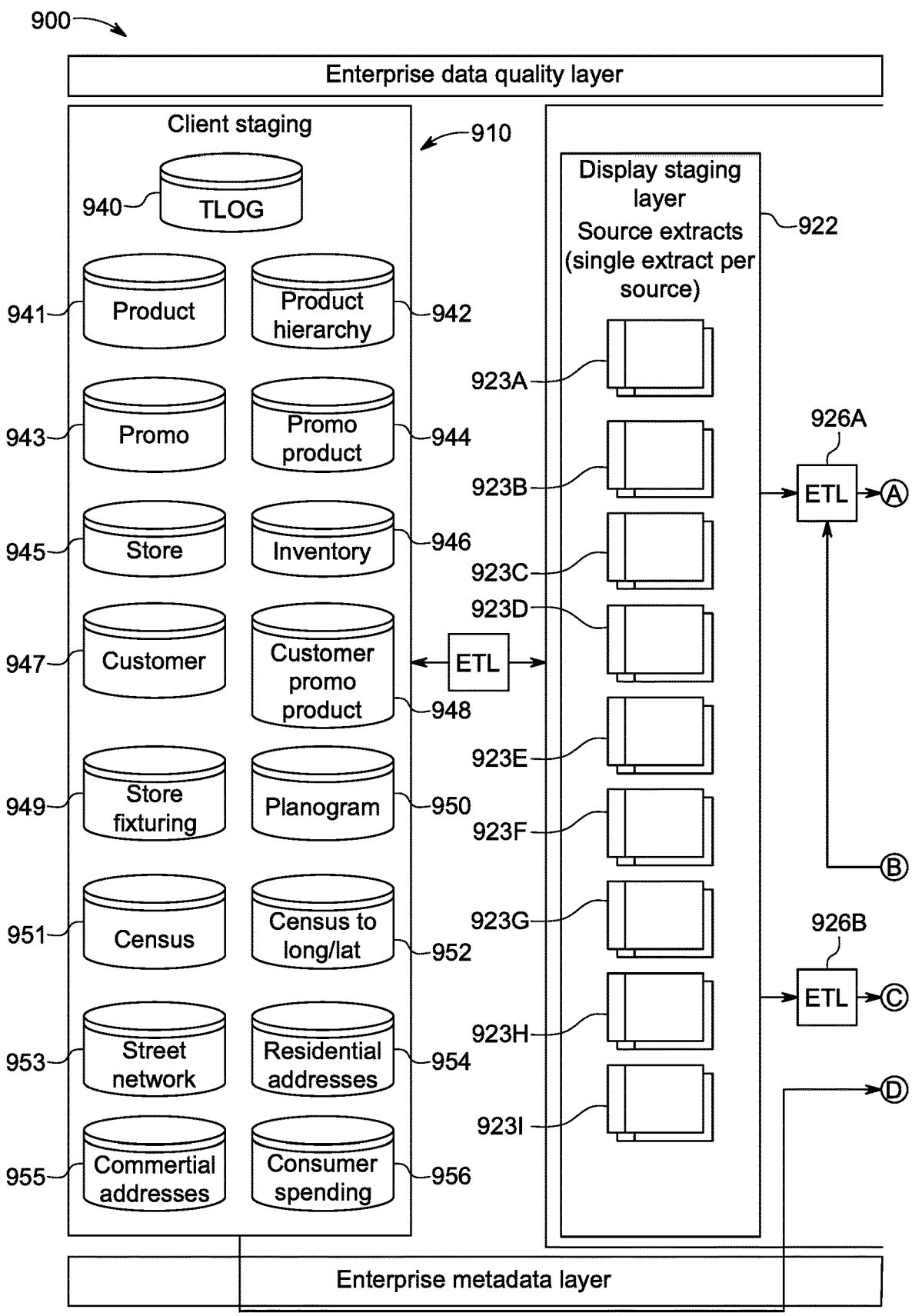
FIG. 9A and FIG. 9B show in diagrammatic form a first and second portion, respectively, of a data warehouse architecture for the retail merchandise planning system according to an embodiment of the present invention.
Figure 9B:
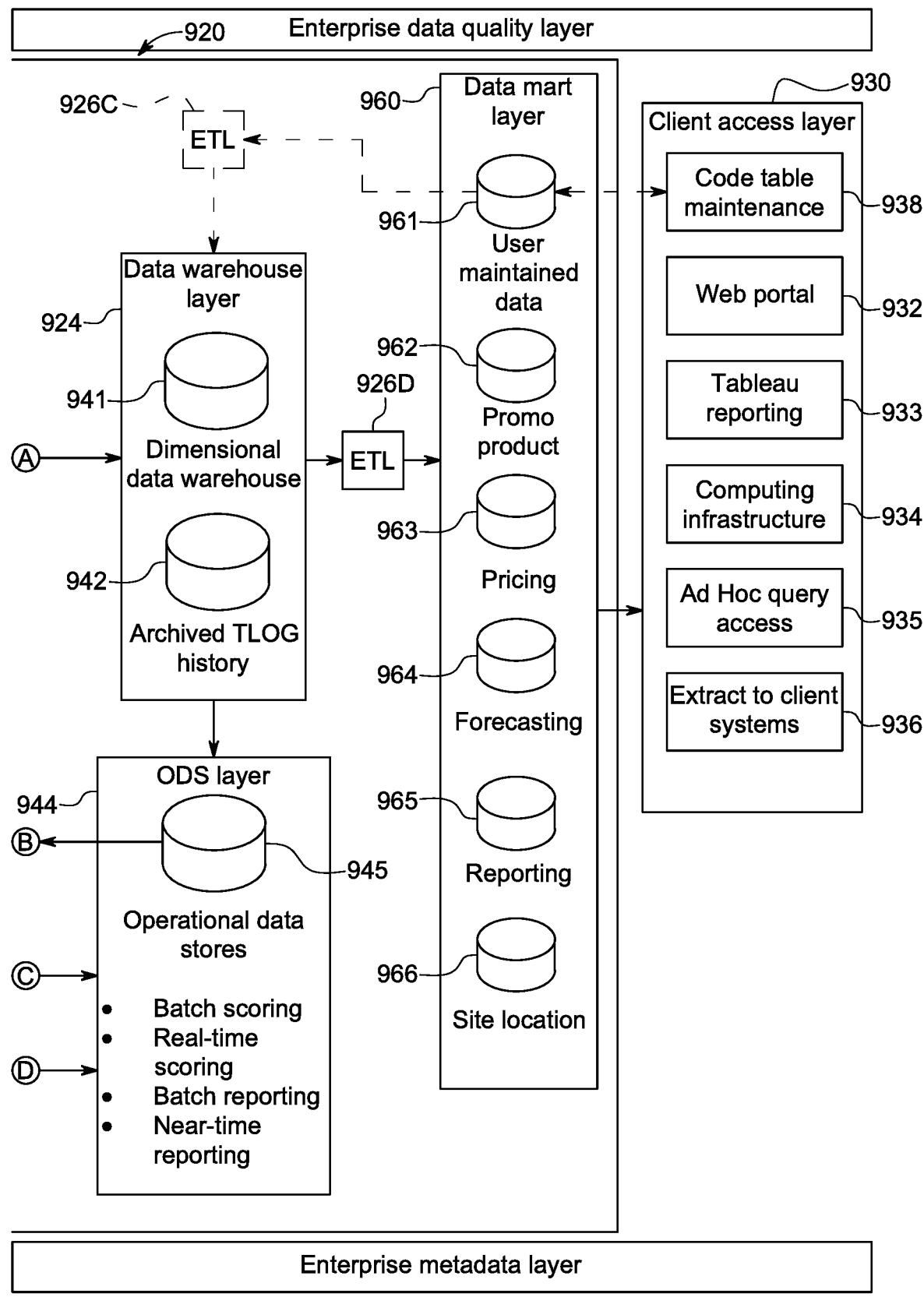

The error handling or exception processing module 840 according to an embodiment is configured to operate under stored program control on a computer and execute the following functions:

- facilitate exception logging for all EDW processing
- minimize the hard coding effort by using operational metadata to drive the exception process; this minimizes code maintenance efforts
- provide a standardized recovery process for all file transformations
- provide simple notification functionality
- provide a consistent interface for exception handling According to another aspect, the exception processing module 840 includes three standardized component interfaces configured to perform the following tasks:
- exception logging
- file recovery
- exception notification The file locking module 850 according to an embodiment is configured to operate under stored program control on a computer and execute the following functions:

- facilitate the exclusive use of a given file resource for serial file updating
- facilitate shared and consistent file read usage
- establish consistent queuing of file lock requests
- integrate with common component for exception and error handling
- the two process flows within this component are the file locking request process and the file locking release process The user maintained database interface 860 according to an embodiment is configured to provide the following functionality:

- a user interface to permit users controlled access to maintain select metadata
- a user interface to permit users to review rejection processing logs
- source data for EDW and ETL processing from the User Maintained Data database
- data flow between the EDW and the User Maintained Database by separate ETL processes Reference is next made to FIG. 9, which shows a data warehouse architecture 900 for the retail merchandise planning system 100 according to an embodiment of the present invention.

The data warehouse architecture 900 comprises a client staging layer 910, a data warehouse indicated generally by reference 920 and a client access layer 930, as shown in FIG. 9. According to an embodiment, the data warehouse 920 comprises a staging layer 922, a data warehouse layer (i.e. enterprise level) 924 and a data mart layer 960. The data warehouse 920 may also include an operational data stores (ODS) layer indicated by reference 944 in FIG. 9.

The client staging layer 910 comprises real-time or batch data associated with the retailer operational systems. As shown, the retailer data comprises a transaction database or log (TLOG) 940, a product database 941, a product hierarchy database 942, a promotions database 943, a promotion products database 944, a stores database 945, an inventory database 946, a customer database 947, a customer promotion products database 948, a store fixturing database 949, a planogram database 950, a census database 951, a census to longitude/latitude database 952, a street network database 953, a residential addresses database 954, a commercial addresses database 955 and a consumer spending database 956. As shown, an ETL module 959 is utilized to extract or transfer data from the retailer database(s) to the staging layer 922. According to an exemplary implementation, the staging layer 922 is configured for a single extract 923 per data source, indicated individually by references 923A, 923B . . . 923I in FIG. 9. Data is selected from the staging layer 922 and transferred to the data warehouse layer 924 utilizing an ETL module 926A. According to an exemplary implementation, the data warehouse layer 924 comprises a dimensional data warehouse indicated by reference 941 and may also include an archived transaction log (TLOG) database indicated by reference 942. As described above, data from the data warehouse 924 is processed by the retail merchandise planning process to generate promotional product(s) planning, product pricing and/or product forecasting. The data mart layer 960 is configured to receive the output generated from the data warehouse layer 924 via an ETL module 926D. According to an exemplary embodiment, the data mart layer 960 comprises a promo product database 962, a product pricing database 963 and a product or sales forecasting database 964. As shown, the data mart layer 960 may also include a user maintained database 961, a reporting database 965 and/or a site location database 966.

As shown in FIG. 9, the operational data stores layer 944 receives data from the staging layer 922 through an ETL module 926B, and according to an exemplary implementation is configured to provide one or more of the following functions: batch scoring; real-time scoring; batch reporting; and/or near-time reporting.

The client access layer 930 is configured to provide access to the data mart layer 960. According to an exemplary implementation, the client access layer 930 comprises a web portal 932, a tableau reporting module 933, a computing infrastructure access module 934, an Ad Hoc query access module 935 and an extract to client system access module 936. The client access layer 930 may also include a code table maintenance access module indicated by reference 938. The particular implementation details of the modules and functionality for the client access layer 930 will readily be within the understanding of one skilled in the art.

Figure 11:
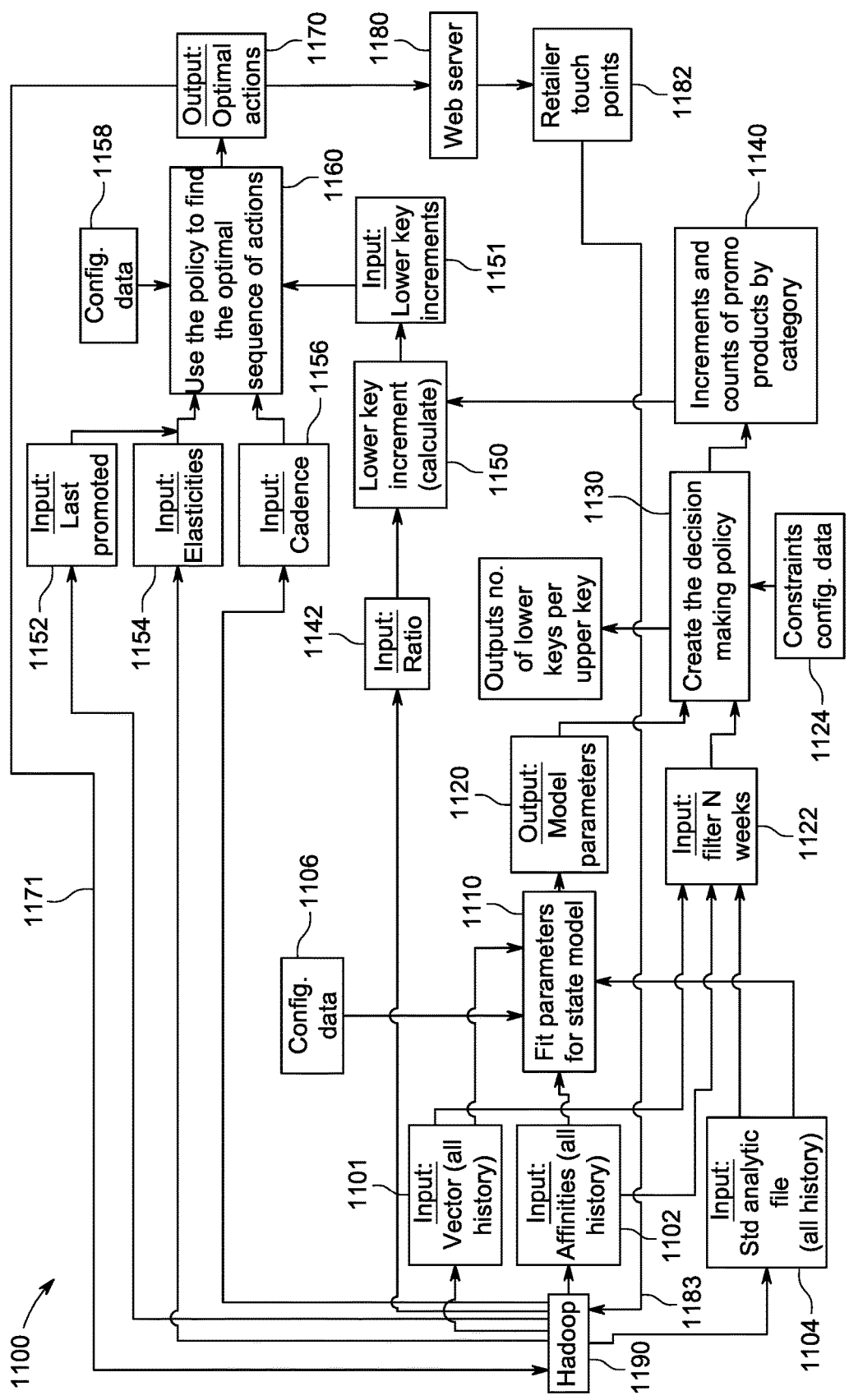
FIG. 11 a product selection process for the intelligent agent module according to an embodiment of the present invention.

Reference is next made to FIG. 11, which shows in more detail the process or control flow (FIG. 5) for the intelligent agent module 400 (FIG. 4) according to an embodiment of the present invention. As shown, the control process executed by the intelligent agent module as described above comprises generating a model or simulated model of the retailer or retailer environment as indicated by reference 1110. The retailer state model function 1110 receives a vector input 1101, an affinities input 1102 and a configuration data input 1106, generated for example as described above. For instance, the control server configures the data input 1106 to execute the steps 522 and 530 (FIG. 5) to determine the coefficients for Equation (1) with the constraints of Equation (2) as described above. The retailer state model function 1110 may also receive as an input a standard analytics file, as shown in FIG. 31 and indicated by reference 1104. The retail state model function 1110 is executed, including for example, executing Equation (1) as described above, and generates an output model of the retailer system or environment as also described above and indicated by reference 1120. The next step as indicated by reference 1130 comprises executing a function to create a decision making policy based on constraints/configuration data 1124, for example, the control server solves Equation (1) using a genetic algorithm to determine the solution vector $x_j$ as described above for steps 540 and 550 in FIG. 5. The output generated by the decision making policy function 1124 comprises increments and counts of products by category 1140, as described above according to an embodiment. The output from the increments and counts of promo products by category function 1140 is inputted to a lower key increment determination function 1150, which also uses a ratio input 1142 which divides, for example, the category output to a lower product hierarchy level (for instance as depicted in FIGS. 20 and 21).

Referring still to FIG. 11, the output, i.e. lower key increments, from the lower key increment determination function 1150 provides an input 1151 to a find optimal sequence of actions (i.e. retail plan generation) function as indicated by reference 1160. The optimal sequence of actions function 1160 is also configured to receive and process inputs including a configuration data input 1158, a last promoted product input 1152, elasticities input 1154 and/or a cadence input 1156 as described above. For instance, in 1158, the control server configures input files 520 (FIG. 5) plus increments which are calculated with partial differentiation of the genetic solution 550 (FIG. 5) to execute the particle swarm on Equation (3) with the constraints of Equation (4) in step 560 as described above. The output that is generated comprises an optimal actions plan 1170. As described above, the optimal actions plan 1170 can comprise a number of retail plans, such as, promotional product selection and duration, promotional periods, sales forecasting, seasonal sales forecasting. For example, as described above 1170 comprises step 570 (FIG. 5) which generates or provides an output to the web server 214 (FIG. 2) for the retailer or client infrastructure 250 (FIG. 2). The optimal actions plan 1170 is accessible by a client system via a Web server as indicated by reference 1180. The results of executing and/or applying optimal actions plan 1170 by the retailer can be applied to a retail touch points function 1182 which configured to generate input(s) 1182 for a feedback loop as described above, and which is indicated generally by reference 1190 in FIG. 11. The optimal actions plan 1170 provides another input 1171 to the feedback loop 1190 (indicated by reference 510 in FIG. 5), for example, to simulate a product promotion or other retailer action or operation. According to an exemplary implementation, input and output data is logged in a metadata server.

Figure 10A:
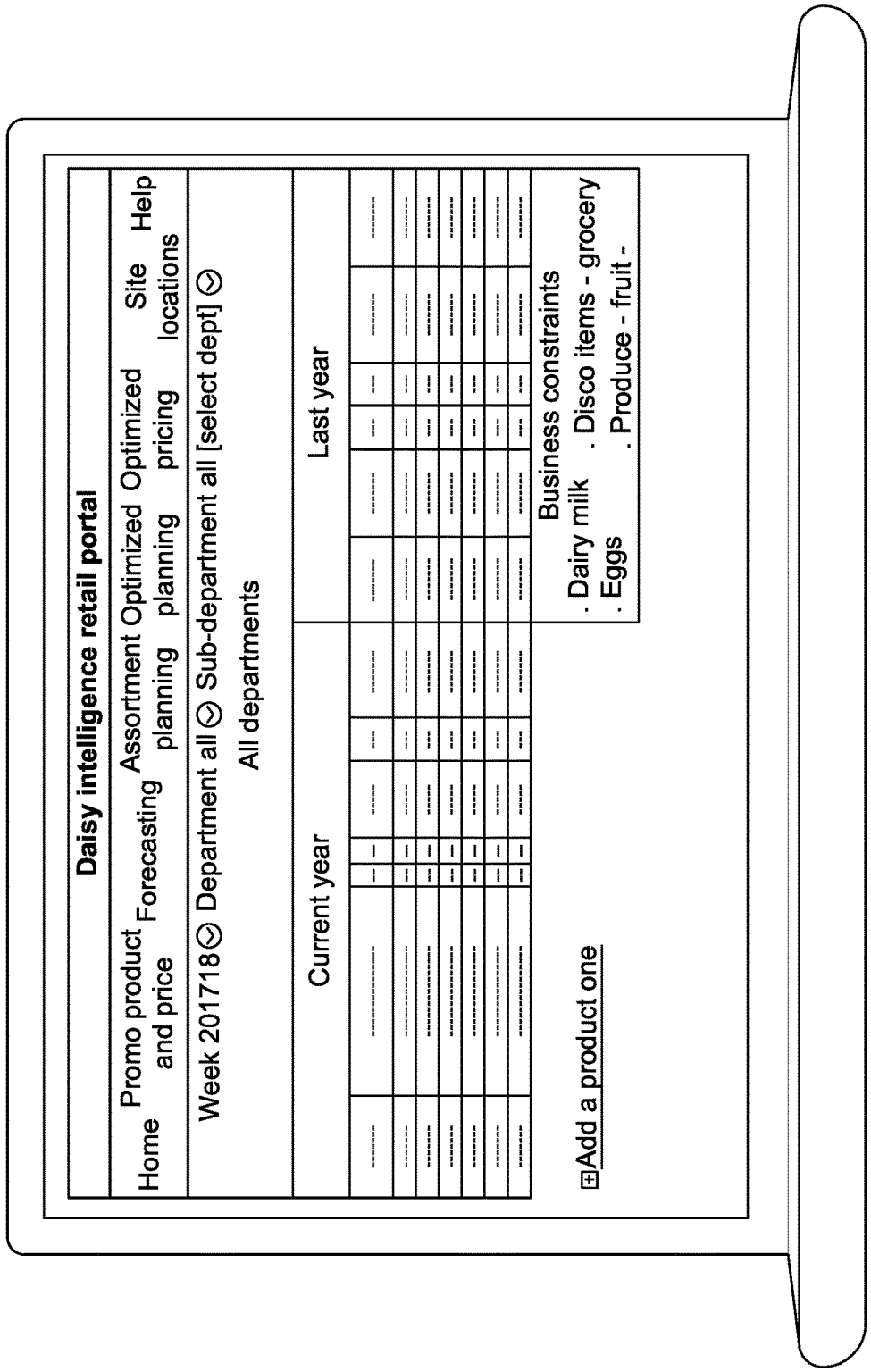
FIG. 10A shows a screen shot of a web portal for accessing an output retail plan according to an embodiment of the present invention.

Reference is next made to FIG. 10A, which shows a screen shot of a web portal according to an embodiment of the present invention and indicated generally by reference 1000. The web portal 1000 is configured to provide web based, i.e. browser, access to the output retail plan generated for a retailer as described above. According to an exemplary embodiment, the web portal 1000 is configured to generate and display a weekly promotions and recommendations web page based on the output retail plan for a retailer. According to one aspect, the web page is configured to provide a constrained view of promotions based on parameters defined for the output retail plan. According to another aspect, the web page is configured to provide an unconstrained view comprising upside promotions and/or recommendations not considered per se in the output retail plan. According to another aspect, the web page is configured for a predetermined, e.g. current, planning cycle. According to another aspect, the web portal 1000 comprises an archive function storing and searching weekly recommendation and promotional pages.

Reference is next made to FIG. 10B which shows a screen shot of an output retail plan web page generated for a retailer comprising a graphical user interface (GUI) and indicated generally by reference 1020. According to an exemplary embodiment, the output retail plan web page 1020 is generated at a retailer level and includes "All Departments" for the retailer. The web page 1020 comprises a "Current Year" display grid 1021 and a "Last Year" display grid 1031. According to an exemplary implementation, the Current Year display grid 1021 comprises a "Sub-Department" column 1022, a "Product" column 1023, a "Relative Index" column 1024, a "Rank" column 1026, and a "Last Promoted" column 1028. The Last Year display grid 1031 comprises a "Promoted Last Year" column 1032, a "Sales" column 1033, a "Transactions" column 1034, a "Quantity" 1035, an "Associated Sales" column 1036 and a "Total Sales" column 1038.

According to an exemplary embodiment, the Relative Index column 1024 is configured to illustrate or show the relative strength of one product recommendation over another product recommendation. The Rank column 1026 can be generated as described above, and provides the retailer with a ranked list of products for promotion and/or driving sales. According to this aspect, the rankings provide a visual reference to assist the retailer in making promotional choices on a product and/or departmental basis. According to another aspect, the Product column 1025 for the retail plan web page 1020 is configured with active links, e.g. HTML links, that allow a user, e.g. a retailer, to 'click' a product link and access further information, i.e. "drill down", associated with the product. According to an exemplary implementation, the product entry links are configured to display additional product information and/or SKU's for the product. According to another aspect, the output retail plan web page 1020 includes an "ADD A PRODUCT LINK" 1025, which is configured to allow a user, e.g. the retailer, to add another product to the retail plan 1020, and populate the associated columns, i.e. Relative Index 1024, Rank 1026 and Last Promoted 1028. According to another aspect, the output retail plan web page 1020 is configured with a business constraints window indicated generally by reference 1041. According to an exemplary embodiment, the business constraints window 1041 provides a quick reference view of business constraints considered in the generation of the output retail plan, for example, as described in more detail above.

Figure 10C:
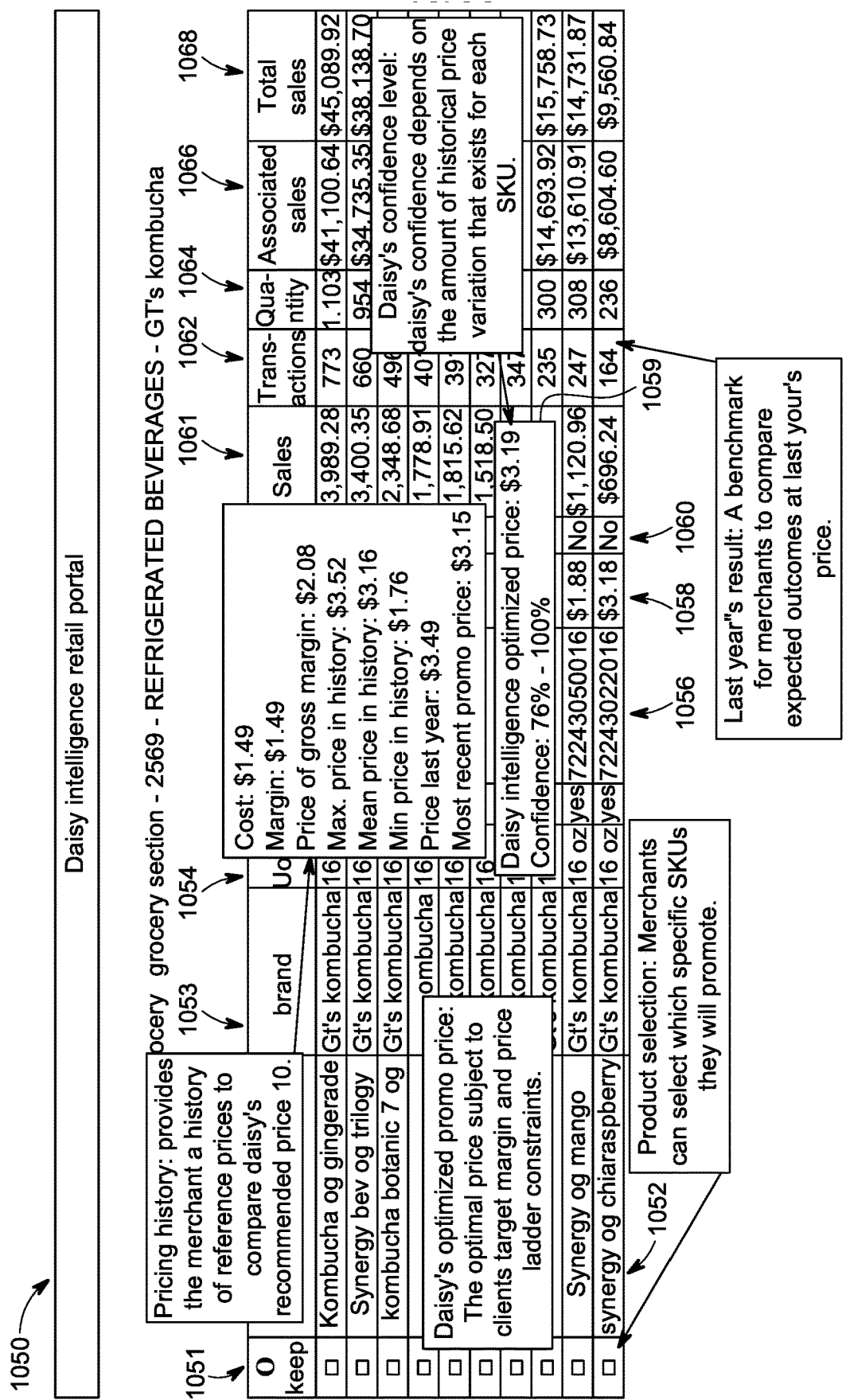
FIG. 10C shows a screen shot of another exemplary output retail plan generated according to an embodiment of the present invention.

Reference is next made to FIG. 10C which shows a screen shot of another exemplary output retail plan web page 1050 generated and displayed in electronic form for a merchandiser or retail operation. As shown, the output retail web page 1050 is generated at the product level and includes a "Product Name" column 1052, a "Product Brand" column 1053, a "UoM" (Unit of Measurement) column 1054, a "Pricing History" column 1056, an "Optimized Price" column 1058, and a "Promoted Last Year" column 1060. According to another aspect, the output retail plan page 1050 is configured with a "Keep" column 1051, which allows the retailer or merchant to select which specific product(s), i.e. SKU(s), to keep in the retail plan, or promote.

According to an exemplary implementation, the Pricing History column 1056 is configured to provide the retailer or merchant with a 'pop-up' window 1057 comprising a history of prices which can be compared to the optimized or recommended price that is generated (for example, as described above) and presented for each product in the Optimized Price column 1058. The optimized price according to an exemplary embodiment comprises the optimized prize as calculated above, subject to parameters such as target margin, price ladder constraints, as described above. According to another aspect, the optimized price for each product is configured with a 'pop-up' window 1059 that includes a "Confidence Level" indicator, e.g. 76%-100%, which is calculated based on amount of historical price variation that exists for each SKU.

According to another aspect, the retail plan web page 1050 is configured with historical data to provide the retailer or merchant with a benchmark for comparing expected outcomes based on last year's prices or sales. According to an exemplary implementation, the web page 1050 comprises a "Sales" column 1061, a "Transactions" column 1062, a "Quantity" column 1064, an "Associated Sales" column 1066 and a "Total Sales" column 1068, as shown in FIG. 10C.

The functionality and features associated with the retail merchandise planning system 100, i.e. the retail merchandise planning computer system 202, comprising the control server 210 and other servers depicted in FIG. 2, and the retailer computer system 204 comprising the retailer operational systems 240 and other components depicted in FIG. 2, as described above and in accordance with the embodiments may be implemented in the form of one or more software objects, components, or computer programs or program modules in the server and/or the client machines and/or other computers or hardware components and/or programmable hardware modules. Further, at least some or all of the software objects, components or modules can be hard-coded into hardware implemented processing or processor units and/or read only memories or other non-volatile storage media in the mobile communication device, server and/or other components or modules depicted in the drawings. The specific implementation details of the software objects and/or program modules and/or hardware components will be within the knowledge and understanding of one skilled in the art.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A computer-implemented method, comprising:
    receiving retail data from at least one retailer computer system;
    transforming the retail data, the retail data comprising at least one selected from the group of customer data, product data, transaction data, price data, promotion data, store data and time data, the retail data corresponding to a time series having one or more time periods;

determining an at least one feature of the transformed retail data;
generating a retail promotional model for operating an intelligent agent, the retail promotional model comprising:
the at least one feature of the transformed retail data; and
a control policy for operating the intelligent agent for selecting two or more promotional products,
providing an intelligent agent module for providing the intelligent agent, the intelligent agent module comprising:
a sensor input component for receiving sensor data comprising a measured reward, wherein the sensor data is representative of a measured state of an environment, the sensor input component correcting a simulated state of the environment based on the sensor data comprising the measured reward;
a memory component comprising a long-term memory representative of a long-term frequency response, the long-term memory storing a plurality of long-term sensor data and a plurality of long-term prior actions, and a short-term memory representative of a short-term frequency response, the short-term memory storing a plurality of short-term sensor data and a plurality of short-term prior actions, the memory component storing the sensor data in the plurality of short-term sensor data of the short-term memory, the memory component storing the sensor data in the plurality of long-term sensor data of the long-term memory;
a simulation component for executing a reinforcement learning algorithm to simulate based on the short-term memory of the memory component, the long-term memory of the memory component, the simulated state of the environment, and the retail promotional model, an expected reward based on the two or more promotional products, the expected reward simulating a sales metric of a plurality of product records in the retail data based on the two or more promotional products; and
the retail promotional model.

2. The method of claim 1, further comprising:
determining a power spectrum based on the retail data by applying a Fourier transform to the retail data; and
wherein the retail promotional model further comprises the power spectrum.

3. The method of claim 2, wherein the determining the at least one feature of the retail data further comprises:
determining the at least one feature of the retail data for each time period based on an association rule mining function; and
wherein the at least one feature of the retail data comprises an N×N matrix.

4. The method of claim 3, further comprising:
determining a set of relevant features from the at least one feature of the retail data based on a linear correlation of each feature in the at least one feature of the retail data with a metric.

5. The method of claim 3, further comprising:
determining a set of relevant features from the at least one feature of the retail data based on a principal component analysis of each feature in the at least one feature of the retail data with a metric.

6. The method of claim 3, further comprising:
determining a set of relevant features from the at least one feature of the retail data based on a least absolute shrinkage and selection operator (LASSO) analysis.

7. The method of claim 3, further comprising:
determining a set of relevant features from the at least one feature of the retail data based on a deep neural network auto encoder analysis.

8. The method of claim 4, wherein the set of relevant features includes one or more feature types, the one or more feature types comprising: a cannibalization type, a cadence type, an associated sales type, a price elasticity type, and a forward buying type.

9. The method of claim 8, wherein:
the retail data further comprises a product hierarchy; and
the one or more feature types further comprises: a product hierarchy type.

10. The method of claim 9, wherein:
the transaction data comprises point-of-sale data;
the promotion data comprises at least one selected from the group of promotion master data, promotion product master data, and promotion product customer data;
the product data comprises product master data;
the store data comprises at least one selected from the group of store data, store master data, planogram data, store grouping data.

11. The method of claim 10, wherein the transforming the retail data further comprises:
applying a holiday adjustment function to the retail data, wherein the holiday adjustment function corrects for calendar date variations in holidays from a first time period to a second time period.

12. The method of claim 11 wherein the association rule mining function is an aprioriTID algorithm.

13. The method of claim 12, further comprising:
determining the control policy for the retail promotional model, by,
executing a reward function based on the retail data for each time period in the one or more time periods;
selecting the at least one feature of the transformed retail data that maximize an output of the reward function for the one or more time periods; and
wherein the control policy further comprises the at least one feature of the transformed retail data.

14. A computer implemented system, comprising:
a memory, the memory having:
retail data, the retail data comprising at least one selected from the group of customer data, product data, transaction data, price data, promotion data, store data and time data, the retail data corresponding to a time series having one or more time periods; and
an intelligent agent module, the intelligent agent module for providing an intelligent agent, the intelligent agent module comprising:
a simulation component for executing a reinforcement learning algorithm to simulate based on a short-term memory of a memory component, a long-term memory of the memory component, a simulated state of an environment, and a retail promotional model, an expected reward based on two or more promotional products, the expected reward simulating a sales metric of a plurality of product records in the retail data based on the two or more promotional products;

a sensor input component for receiving sensor data comprising a measured reward, wherein the sensor data is representative of a measured state of the environment; and the memory component comprising the long-term memory representative of a long-term frequency response, the long-term memory storing a plurality of long-term sensor data and a plurality of long-term prior actions, and the short-term memory representative of a short-term frequency response, the short-term memory storing a plurality of short-term sensor data and a plurality of short-term prior actions, and the retail promotional model, a processor in communication with the memory, the processor configured to:

receive the retail data from at least one retailer computer system;

transform the retail data;

determine an at least one feature of the transformed retail data;

generate the retail promotional model for operating the intelligent agent, the retail promotional model comprising:

the at least one feature of the transformed retail data; and a control policy for operating the intelligent agent for selecting the two or more promotional products, store the retail promotional model in the intelligent agent module;

storing the sensor data in the plurality of short-term sensor data of the short-term memory, storing the sensor data in the plurality of long-term sensor data of the long-term memory; and correcting the simulated state of the environment based on the sensor data comprising the measured reward.

15. The system of claim 14 wherein the processor is further configured to:

determine a power spectrum based on the retail data by applying a Fourier transform to the retail data; and wherein the retail promotional model further comprises the power spectrum.

16. The system of claim 15 wherein the processor is further configured to:

determine the at least one feature of the retail data for each time period based on an association rule mining function; and wherein the at least one feature of the retail data comprises an N×N matrix.

17. The system of claim 16 wherein the processor is further configured to:

determine a set of relevant features from the at least one feature of the retail data based on a linear correlation of each feature in the at least one feature of the retail data with a metric.

18. The system of claim 16 wherein the processor is further configured to:

determine a set of relevant features from the at least one feature of the retail data based on a principal component analysis of each feature in the at least one feature of the retail data with a metric.

19. The system of claim 16 wherein the processor is further configured to:

determine a set of relevant features from the at least one feature of the retail data based on a least absolute shrinkage and selection operator (LASSO) analysis.

20. The system of claim 16 wherein the processor is further configured to:

determine a set of relevant features from the at least one feature of the retail data based on a deep neural network auto encoder analysis.

21. The system of claim 17 wherein the set of relevant features includes one or more feature types, the one or more feature types comprising: a cannibalization type, a cadence type, an associated sales type, a price elasticity type, and a forward buying type.

22. The system of claim 21, wherein:

the product data further comprises a product hierarchy; and the one or more feature types further comprises: a product hierarchy type.

23. The system of claim 22, wherein:

the transaction data comprises point-of-sale data;

the promotion data comprises at least one selected from the group of promotion master data, promotion product master data, and promotion product customer data;

the product data comprises product master data;

the store data comprises at least one selected from the group of store data, store master data, planogram data, store grouping data.

24. The system of claim 23, wherein the processor is further configured to:

apply a holiday adjustment function to the retail data, wherein the holiday adjustment function corrects for calendar date variations in holidays from a first time period to a second time period.

25. The system of claim 24 wherein the association rule mining function is an aprioriTID algorithm.

26. The system of claim 24 wherein the processor is further configured to:

determine the control policy for the retail promotional model, by, executing a reward function based on the retail data for each time period in the one or more time periods;

selecting the at least one feature of the transformed retail data that maximize an output of the reward function for the one or more time periods; and wherein the retail promotional model further comprises the at least one feature of the transformed retail data.

* * * * *